US012210372B1

(12) United States Patent
Guarro et al.

(10) Patent No.: US 12,210,372 B1
(45) Date of Patent: Jan. 28, 2025

(54) CLOCK DRIFT MONITORING AND CORRECTION FOR AUTONOMOUS VEHICLES

(71) Applicant: Zoox, Inc., Foster City, CA (US)

(72) Inventors: Marcello Daniele Guarro, Santa Cruz, CA (US); Eric Andre Senant, Albany, CA (US)

(73) Assignee: Zoox, Inc., Foster City, CA (US)

( * ) Notice: Subject to any disclaimer, the term of this patent is extended or adjusted under 35 U.S.C. 154(b) by 41 days.

(21) Appl. No.: 18/117,803

(22) Filed: Mar. 6, 2023

(51) Int. Cl.
 *G06F 1/12* (2006.01)
 *B60W 60/00* (2020.01)

(52) U.S. Cl.
 CPC ........... *G06F 1/12* (2013.01); *B60W 60/0015* (2020.02); *B60W 2510/18* (2013.01)

(58) Field of Classification Search
 CPC .. G06F 1/12; B60W 60/0015; B60W 2510/18
 See application file for complete search history.

(56) References Cited

U.S. PATENT DOCUMENTS

| 12,038,783 | B1 * | 7/2024 | Maydiga | G06F 1/14 |
| 12,085,977 | B2 * | 9/2024 | Wilson | G06F 9/30021 |
| 2012/0280714 | A1 * | 11/2012 | Silverman | G01S 5/06 |
| | | | | 326/93 |
| 2019/0294204 | A1 * | 9/2019 | Castro | G06F 1/12 |
| 2022/0264463 | A1 * | 8/2022 | Li | H04W 24/04 |
| 2023/0367358 | A1 * | 11/2023 | Manevich | H04J 3/0697 |
| 2024/0259966 | A1 * | 8/2024 | Murphy | A61B 5/6803 |

* cited by examiner

*Primary Examiner* — Zahid Choudhury
(74) *Attorney, Agent, or Firm* — EIP US LLP

(57) ABSTRACT

There are provided techniques including a system, method, and computer-readable medium for clock drift monitoring and correction for autonomous vehicles. The method may include the steps of: determining that a first clock or a second clock of a vehicle is unable to synchronize with a common master clock of the vehicle according to a clock synchronization protocol, wherein the first clock and the second clock are associated with a first device and a second device of the vehicle respectively; and in response: determining a first value indicating a relative clock drift between the first clock and the second clock; determining a first time associated with data provided by the second device to the first device, the first time being determined according to the second clock; and determining a corrected first time according to the first clock based at least in part on the first value and the first time.

20 Claims, 8 Drawing Sheets

CLOCK DRIFT MONITORING AND CORRECTION FOR AUTONOMOUS VEHICLES

BACKGROUND

Data may be timestamped to enable its use by a computing device. A timestamp may designate a time at which the data was generated. Timestamping may be performed according to a clock associated with the device, e.g. a sensor, that generated the data. In complex systems such as autonomous vehicles, there may be many different devices in different parts of the system and these devices may use different clocks to timestamp their data. Clocks within the system may be synchronized according to a clock synchronization protocol to ensure that the timestamps assigned to data from different devices are comparable.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
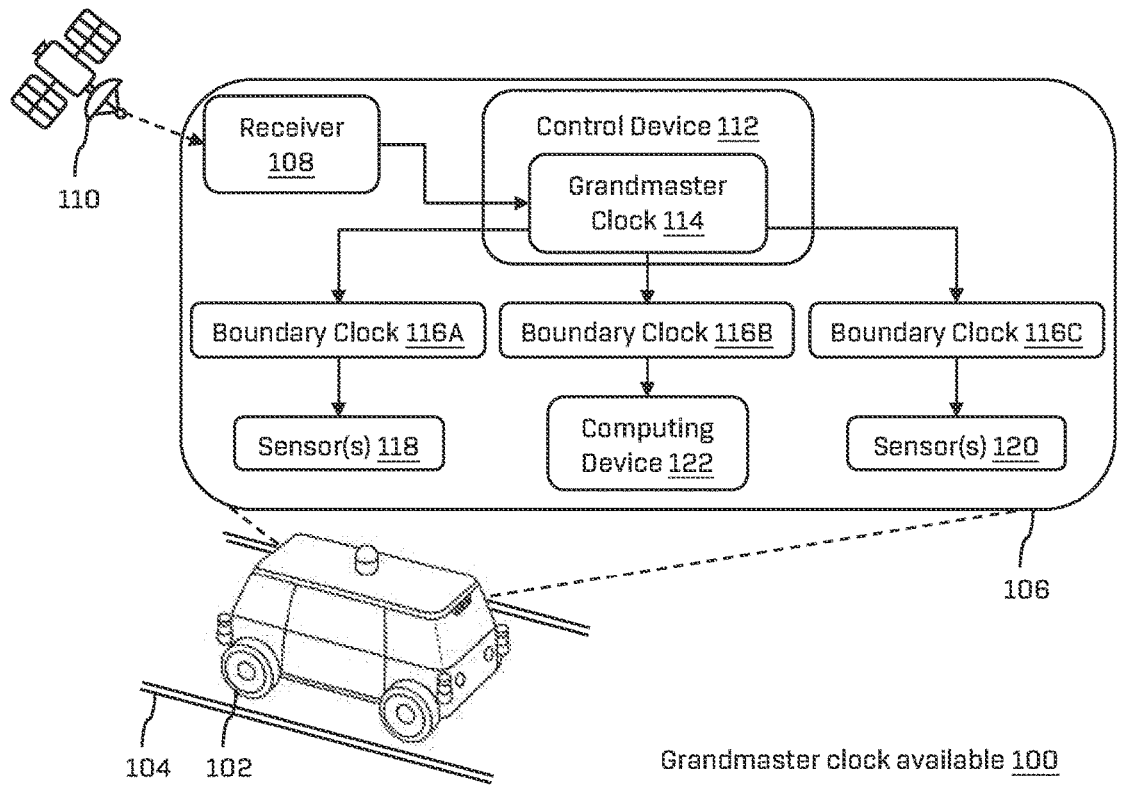
FIG. 1 is a pictorial diagram of a vehicle and a timing network of the vehicle in a first scenario in which a grandmaster clock is available and a second scenario in which the grandmaster clock is unavailable according to aspects of the present invention.
Figure 1:
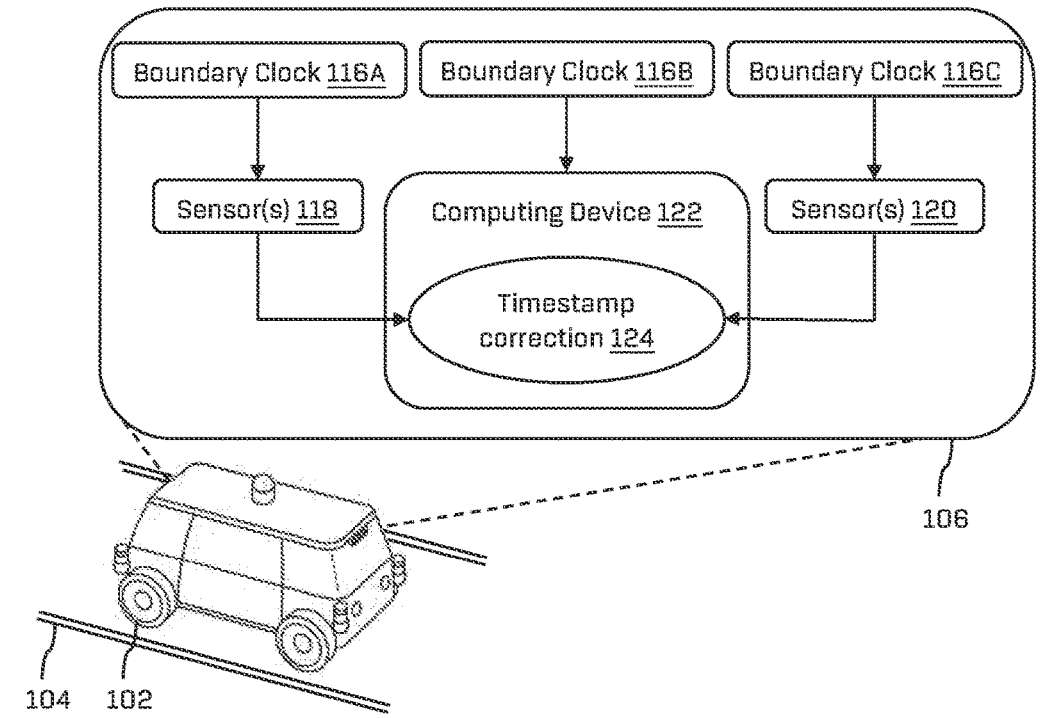

This application relates to techniques including methods, systems, and computer-readable media for monitoring and correcting clock drift in a vehicle, such as an autonomous vehicle, a semi-autonomous vehicle, or a manual vehicle. The monitoring and correction of clock drift between clocks may be performed in the event that a common master clock of the vehicle, according to which the clocks synchronize, becomes unavailable. For example, the common master clock may become unavailable when at least one of the master clock, a control unit in which the master clock resides, or a connection between the master clock and one or more other clocks malfunctions. In other examples, a synchronization protocol may not be able to be implemented between the common master clock and the other clocks. As a result, synchronization of other clocks with the common master clock may not be possible and synchronization between those other clocks may also not be possible. The techniques described herein enable clock drift to be corrected so that timestamps determined according to the clocks whose common master clock is unavailable are comparable and a form of synchronization may be maintained. Correcting clock drift may allow computing devices within the vehicle to continue using data bearing timestamps from those clocks, whereas without correction the data may have had to be disregarded. The master clock, the control unit, or the connection may subsequently return to full function again, and the techniques described herein allow for normal operation until that point. Enabling continued operation may allow a vehicle, such as an autonomous or semi-autonomous vehicle, to complete a journey and avoid stopping prematurely. An autonomous vehicle may include a backup control unit to take over operation of the vehicle when a main control unit fails, and the techniques described herein may enable continued operation of the vehicle between failure of the main control unit and initiation of the backup control unit and after the backup control unit has begun operation of the vehicle. The techniques described herein may also enhance redundancy within the vehicle. Further benefits of the invention may include providing the ability to determine when a relative drift between two clocks is too high as to potentially compromise the operation of the vehicle and to act accordingly.

The techniques may involve monitoring at least one clock within a vehicle relative to another clock within the vehicle to determine a value for clock drift between them. Clocks may be implemented as oscillator devices, such as a MEMS oscillator. Oscillators involve mechanical parts that oscillate at a frequency. Based on the frequency, a timestamp or other time signal (such as a 1 pulse-per-second signal) may be determined. Manufacturing tolerances, environmental conditions such as temperature variations, variations in supply voltage, and other factors affecting the oscillators may mean that different oscillators oscillate at different rates. While the different rates may be small, over time the result may be a growing divergence between timestamps generated by different clocks. This may be referred to as drifting, and the amount by which the timestamps differ at a given time may be referred to as an amount of or value for clock drift. A value for clock drift represents a difference between the first and second clock at a point in time due to a difference in the frequencies at which the first and second clock oscillate.

For example, a first clock may be associated with a first device and a second clock may be associated with a second, different device. The first clock and the second clock may have an initial phase difference between them, which may be referred to as an offset. In the absence of a common master clock, the first clock and the second clocks cannot synchronize with the common master clock. Because the first clock and the second clock may be unable to synchronize with the common master clock, they may also be unable to synchronize with each other. As a result, the first clock and the second clock may drift relative to one another, so that a value for clock drift between them changes over time. The offset is a difference in an initial clock signal, and differs from clock drift which is a difference established over time due to different frequencies.

The value for clock drift between the first clock and the second clock may change according to a drift rate, which may vary linearly. The drift rate may change over time, such that the first clock drifts more or less relative to the second clock with increasing time. When the first clock and the second clock are synchronized, timestamps generated by each of the first clock and the second clock at the same point in time may be the same. However, where the first clock and the second clock are not synchronized, drifting between the first clock and the second clock may cause a timestamp generated according to the first clock and a timestamp generated according to the second clock at the same point in time to indicate different times.

Where a first clock and a second clock are not synchronized, drifting between the first clock and the second clock as described above may mean that timestamps generated by the second clock are not usable by the first device and/or that timestamps generated by the first clock are not usable by the second device. Where there are more than a first clock and a second clock that are unable to synchronize with a common master clock, each clock may oscillate at a different rate to each other clock, meaning that the value for clock drift between each clock may vary over time and the timestamps generated by each clock may not be comparable.

In order to ensure that timestamps received according to, e.g., the second clock by the first device are comparable, a value for the clock drift between the first clock and the second clock may be determined. Data may be received at the first device with a timestamp determined according to the second clock. The data may be generated by the second device, for example. Based on a determined value for clock drift between the first and second clocks, the timestamp received with the data, and which was determined according to the second clock, may be corrected to account for the determined clock drift. The value may be an amount of clock drift at a particular time. Based on the timestamp received with the data, a new, corrected timestamp may be determined in which the clock drift is accounted for. The corrected timestamp that has been corrected based on the value for clock drift may therefore be comparable with other timestamps generated by the first clock. The corrected timestamp may be associated with the data for use in controlling the vehicle. The corrected timestamp may therefore effectively be considered to be synchronized with the first clock, without the second clock being in synchrony with the first clock.

The value for the clock drift may be or may be determined based on a ratio that quantifies how the clocks drift relative to one another. The value may be determined based on a drift metric such as an equation or a model, or based on prediction according to a time series indicating corresponding times between the two clocks. For example, a clock's phase relative to another clock may be modelled. The modelling may be according to a first order polynomial equation or a second order polynomial equation. The clock drift may be determined according to the relative phase.

Where clock drift from a second clock is corrected relative to a first clock, the first clock may have been designated as a reference clock for the second clock. While the first clock acting as a reference clock may be prohibited from acting or unable to act as a master clock for the purposes of synchronization using a clock synchronization protocol used by the timing network, it may still enable a form of synchronization between difference clocks.

Generally, to avoid clock drift, clocks of a timing network may be synchronized to a common master clock. The techniques of the present application may be performed where one or more clocks are unable to synchronize with the common master clock. This inability may be due to the common master clock being unavailable, either due to the clock itself being unavailable or a control unit in which it resides being unavailable, or a connection between the common master clock and the clock being unavailable. As a result, synchronization according to a clock synchronization protocol may not be able to be performed. Correcting timestamps in this way to account for clock drift may have the effect of allowing timestamps to be synchronized without active synchronization of the clocks. In other words, timestamps generated by two different clocks that are not synchronized and have an amount of drift between them may be themselves 'synchronized' at the first device or elsewhere, as if they were generated by synchronized clocks. This may be referred to as a posteriori correction/synchronization or as passive correction/synchronization, in contrast to the active correct/synchronization of clocks when the synchronization with a common master clock is available.

To briefly expand on synchronization between clocks, during synchronization, a common timing reference may be provided to one or more clocks of a timing network by a master clock. The master clock may be a grandmaster clock. The grandmaster clock may be a more accurate clock than other clocks within the timing network or may receive a timing reference from a more accurate clock, such as an atomic clock. For example, the grandmaster clock may receive a timing reference and synchronize with one or more satellites of a satellite navigation system, such as a Global Navigation Satellite System (GNSS). Examples of such satellite navigation systems include the Global Positioning System (GPS), the Global Navigation Satellite System (GLONASS), the BeiDou Navigation Satellite System, and Galileo. One or more clocks may directly synchronize with the grandmaster clock. These clocks may themselves act as master clocks for clocks later in the timing network. Accordingly, a common master clock may be any clock within the timing network with which more than one other clock in the timing network is configured to synchronize.

Synchronization with a common master clock such as a grandmaster clock may occur according to a clock synchronization protocol. An example of a clock synchronization protocol is the Precision Timing Protocol. Using a clock synchronization protocol, even though clocks may drift relative to one another, the regular synchronization of the clocks avoids the drift from becoming a latent error. The clocks may therefore drift between synchronizations but the regularity of the synchronization may avoid the drift from affecting operation of the system in which the clocks are used and the drift may be considered to be effectively eliminated at each synchronization.

However, in some circumstances, a master clock may be unavailable for synchronization or synchronization may not be able to be performed. For example, a control unit in which the master clock is provided may fail, or the master clock itself may fail. As a result, clocks within the timing network may be unable to synchronize with their common master clock and the time at those clocks may drift relative to one another (and relative to the time kept by the master clock) as a result. In some implementations of a clock synchronization protocol, such as automotive clock synchronization protocols, the use of a back-up grandmaster clock may be prohibited. Thus, there may be a need to enable effective synchronization between timestamps in the event that synchronization between clocks is not possible. This may be achieved, by determining and accounting for relative drift between clocks that are unable to synchronize.

In some examples, the clocks and components or devices associated with those clocks may be operated without synchronization. In these examples, a value for the clock drift between at least two clocks may be determined and compared to a threshold value. The vehicle may be operated as normal if the value for the clock drift does not exceed the threshold value. The vehicle may be operated in a degraded state if the value for the clock drift is determined exceeds the threshold value. The vehicle may also or alternatively be operated to perform a mitigating action if the value for the clock drift is determined to exceed the threshold value. In a degraded state, the vehicle may operate without using data from one or more components, i.e. said data may be disregarded. A mitigating action may comprise performing a safe-stop maneuver, or requesting assistance from a teleoperator.

FIG. 1 illustrates an example of synchronization of clocks of a timing network with a common master clock and unavailability of such synchronization. FIG. 1 show a first scenario 100 in which an autonomous vehicle 102 is travelling on a road 104. The autonomous vehicle 102 includes a vehicle system, a portion 106 of which is shown in the scenario 100.

The system 106 may include a receiver 108. The receiver 108 may be configured to receive timing information from one or more satellites 110. The satellite(s) 110 may be part of a satellite navigation system such as GPS, GLONASS, BeiDou, Galileo, or another GNSS. The receiver 108 may be configured to provide the received timing information to a grandmaster clock 114. The grandmaster clock 114 may be part of a control device 112 of the vehicle 102. The control device 112 may be a main control device of the autonomous vehicle 102, such as an executive motion unit (EMU). The control device 112 may be an automotive-grade component, which may allow it to house the grandmaster clock 114 according to the clock synchronization protocol. For example, the control device 112 may include hardware that meets one or more requirements set out in a clock synchronization protocol for automotive applications. Specifically, one or more ethernet switches of the control device 112 may comply with requirements of a standard, enabling the control device 112 to include a clock that can operate as the grandmaster clock 114. The control device 112 may be configured to receive control commands from one or more computing devices of the autonomous vehicle 102 and to implement those control commands by controlling hardware of the vehicle 102 such as motors, brake calipers, and steering mechanisms.

The grandmaster clock 114 may be part of a timing network of the vehicle 102 and its systems 106. The timing network, in the present example, may be configured to operate according to a clock synchronization protocol, such as the Precision Timing Protocol. The Precision Timing Protocol, or PTP, is a protocol used to synchronize clocks in a network. PTP may synchronize clocks within a timing network with sub-microsecond accuracy. PTP is described in IEEE standard 1588. The industrial application of PTP, referred to as gPTP, is described in IEEE 802.1AS. The techniques herein may be used in vehicles that include timing networks operating according to gPTP, and specifically IEEE802.1AS-2011. While PTP is described below as an example of a clock synchronization protocol, it will be appreciated that other clock synchronization protocols may be employed in other examples, such as Network Time Protocol (NTP) or Simple Network Time Protocol (SNTP). These clock synchronization protocols may prevent or disallow implementation of a backup grandmaster clock, and the techniques herein may provide a backup solution for when the grandmaster clock is unavailable. Other clock synchronization protocols, such as IEEE802.1AS-2020, may allow a backup grandmaster clock and the techniques herein may provide an alternative or further backup solution.

In PTP, a grandmaster clock may be a master clock that all other clocks in the timing network are configured to synchronize with. The grandmaster clock may be a high-precision, GPS-enabled clock, or a clock that is synchronized to GNSS or other high-precision time source.

In FIG. 1, the timing network may also include a plurality of boundary clocks 116A, 116B, 116C. Although not shown in FIG. 1, the boundary clocks 116A-C may be included in one or more network switches. In PTP, a boundary clock may synchronize with a master clock higher in the timing network such as the grandmaster clock or a higher boundary clock and act as a master clock for other clocks later in the timing network. The other clocks which synchronize with the boundary clocks may be further boundary clocks or ordinary clocks. The timing network may also include transparent clocks. The boundary clocks 116A-C of FIG. 1 have the grandmaster clock 114 as a common master clock, but in other arrangements, one or more further boundary clocks may be positioned between the boundary clocks 116A-C and the grandmaster clock 114, such that one of the further boundary clocks acts as the common master clock to the later boundary clocks.

Clocks within a PTP timing network may sync with a master clock by exchanging a series of messages. In the example of a boundary clock synchronizing with a grandmaster clock, the grandmaster clock periodically broadcasts the current time as a message to each boundary clock. The grandmaster clock may broadcast the current time multiple times per second. The current time may be provided in an initial 'Sync' message or as part of a 'Follow_Up' message providing an accurate timestamp for the initial sync message. The boundary clock may calculate a network transit delay for the message based on the time in the sync or follow-up message and the time it received the message according to its clock. Having received the message(s) from the grandmaster clock, the boundary clock may then send a 'Delay_Req' message to the grandmaster clock, asking it to send a 'Delay_Resp' message. The grandmaster clock may then send the requested 'Delay_Resp' message to the boundary clock. The Delay_Req message is received by the grandmaster clock, and the time of receipt of that message by the grandmaster clock is included in the Delay_Resp message. Based on this information, the boundary clock may determine a round trip delay from which it may subsequently determine an offset of its own time relative to the grandmaster clock. To synchronize with the grandmaster, the boundary clock may correct its own time to account for the offset. This process may also be performed by boundary clocks or ordinary clocks to synchronize with other boundary clocks.

Returning to FIG. 1, each boundary clock 116A-C may be associated with one or more devices. For example, as shown in FIG. 1, boundary clocks 116A and 116C may be associated with one or more sensors 118, 120. Boundary clock 116B maybe associated with a computing device 122. The computing device 122 may be a primary computing device of the autonomous vehicle, such as an AI or computer vision primary computing device.

Each of the sensors and/or computing device 118, 120, 122 may include a corresponding ordinary clock configured to synchronize with the preceding boundary clock according to the clock synchronization protocol. The sensors 118 may include ordinary clocks configured to synchronize with boundary clock 116A, the sensors 120 may include ordinary clocks configured to synchronize with boundary clock 116C, and the computing device 122 may include an ordinary clock configured to synchronize with the boundary clock 116B. Accordingly, each boundary clock 116A-C and their respective ordinary clocks together form a timing island that, in normal operation, may be synchronized with a common master clock, e.g. the grandmaster clock 114 as in scenario 100. For example, boundary clock 116A and the ordinary clocks of the sensors 118 may be considered as a first timing island. The clocks in the first timing island are synchronized to the boundary clock 116A. The boundary clock 116A may be synchronized to the grandmaster clock 114, when synchronization with the grandmaster clock 114 is available as in scenario 100.

The sensors 118, 120 may be configured to generate sensor data relating to the autonomous vehicle, such as data relating to its environment, to the interior of the vehicle and its occupants, and/or to the vehicle systems. The sensors 118, 120 may be configured to provide sensor data to the computing device 122. The computing device 122 may be configured to use the sensor data provided to it to generate control commands for providing to the control device 122.

Data generated by each sensor 118, 120 may be timestamped. The timestamp may be generated according to the ordinary clock associated with each sensor 118, 120. The ordinary clocks of the sensors 118, 120 and the computing device 122 may be synchronized with their respective boundary clocks 116A, 116C, 116B. The boundary clocks 116A-C may be synchronized with the grandmaster clock 114. Therefore, the boundary clocks 116A-C may be in synchrony, and the ordinary clocks may also be in synchrony. For this reason, timestamps generated according to any of the ordinary clocks or boundary clocks are comparable with timestamps generated according to any other ordinary clock or boundary clock.

Although not depicted in FIG. 1, the devices and components of the systems 106 may be connected by a suitable communications network.

FIG. 1 also shows a second scenario 150, in which the boundary clocks 116A-116C are unable to synchronize with their common master clock, e.g. the grandmaster clock 114. The grandmaster clock 114 may be unavailable due to a failure within the timing network. For example, the grandmaster clock 114 itself may fail or malfunction. In some examples, the control unit 112 may fail or malfunction. In some examples, the communication network may fail between the grandmaster clock and the boundary clock(s) 116A-116C. In some examples, one or more further boundary clocks may be provided between the grandmaster clock 114 and the boundary clocks 116A-C, and the boundary clocks 116A-C may be configured to synchronize with one of the further boundary clocks. The further boundary clocks that the boundary clocks may be configured to synchronize with may fail, thereby preventing synchronization of the boundary clocks 116A-C with the grandmaster clock 114. Specifically, the boundary clocks 116A-C may be unable to perform the synchronization according to the clock synchronization protocol. For example, where PTP is used, the boundary clocks 116A-C may be unable to receive one or more of 'Sync', 'Follow_Up', or 'Delay_Resp' messages, or may be unable to send 'Delay_Req' messages. In some examples, the messages received may not include the requisite timestamps to enable the protocol to be followed by the boundary clocks 116A-C. In scenario 150, the unavailability of the grandmaster clock 114 to the boundary clocks 116A-C is depicted by the grandmaster clock 114, control unit 112, receiver 108, and satellite 110 not being shown.

Due to the boundary clocks 116A-C being unable to synchronize with the grandmaster clock 114, they may also be unable to synchronize with each other. As a result, timestamps generated by each boundary clock 116A-C may include an amount of relative clock drift. While ordinary clocks, such as those of sensors 118, 120 and computing device 122, may be able to continue synchronizing with the time of the boundary clocks 116A-C according to the clock synchronization protocol, relative clock drift between the boundary clocks may cause timings of ordinary clocks that synchronize with different boundary clocks to diverge. In other words, the clocks within each timing island, of which one of each boundary clock 116A-C is at the head, may drift relative to one another. Drift between boundary clocks may result in errors being introduced in the operation of the vehicle or in unusable data being provided to the computing device 122.

The computing device 122 may be configured to determine that synchronization with the grandmaster clock 114 cannot be performed. In some examples, the computing device 122 may be configured to monitor whether the grandmaster clock 114 and/or the control device 112 is available. In some examples, the computing device 122 may receive an indication from a monitoring or diagnostics system of the vehicle 102 that indicates that there has been a malfunction and/or that synchronization cannot be performed. In some examples, the computing device 122 may be configured to passively monitor timestamps received from the sensors 118, 120 and to determine clock drift between them. If the clock drift exceeds a threshold value, then the computing device 122 may determine that the grandmaster clock 114 is unavailable for synchronization. In some examples, the computing device 122 may receive from the boundary clock 116B, in response to a request or otherwise, an identifier indicating that the boundary clock 116B has not been able to perform synchronization according to PTP with the grandmaster clock 114. When the boundary clock 116B is able to perform synchronization, it may provide a different identifier.

In response, the computing device 122 may act to perform timestamp correction 124 as indicated in scenario 150. The boundary clock 116B and/or an ordinary clock deriving its time from boundary clock 116B may be used as a reference clock. The time at the boundary clock 116B may be taken to be the correct time, with time on the other clocks being considered to be drifting relative to that on the boundary clock 116B. Timestamp correction may be performed for timestamps generated by ordinary clocks associated with other boundary clocks 116A, 116C. Corrected timestamps may be generated according to the boundary clock 116B. The corrected timestamps may be associated with the data to replace the original timestamps.

Timestamp correction 124 is performed to ensure that timestamps received with data from different timing islands, e.g. from devices associated with different boundary clocks such as, e.g. the sensors 118, 120, within the autonomous vehicle are correct according to the boundary clock 116B. The timestamp correction may be performed by determining an amount of drift between the boundary clock 116B and the boundary clock corresponding to the device from which data was received and correcting the timestamp to account for the amount of drift. This may be achieved, as will be described below, by determining a value indicative of relative clock drift between a reference clock, i.e. the boundary clock 116B or timebase, i.e. the timing island including the boundary clock 116B, and the clock from which the timestamp is received. The value may be an amount of drift, a weighting, factor, or ratio indicating a relationship between timestamps generated in each clock, or another value. The value may be determined based on a ratio of timestamps generated by each clock, or based on models of the clocks. Metrics such as a relative phase of the clocks may be determined. A metric may comprise an error metric, that indicates step errors or frequency jumps between the clocks.

Although not illustrated in FIG. 1, additionally or alternatively to performing timestamp correction 124, the computing device 122 may be configured to monitor the clock drift and to perform one or more other actions. For example, as will be described in relation to FIG. 8, the computing device 122 may control the vehicle based on an amount of clock drift between at least a first and a second clock. The computing device 122 may be configured to disregard data from one or more sensors based on an amount of clock drift.

Figure 2:
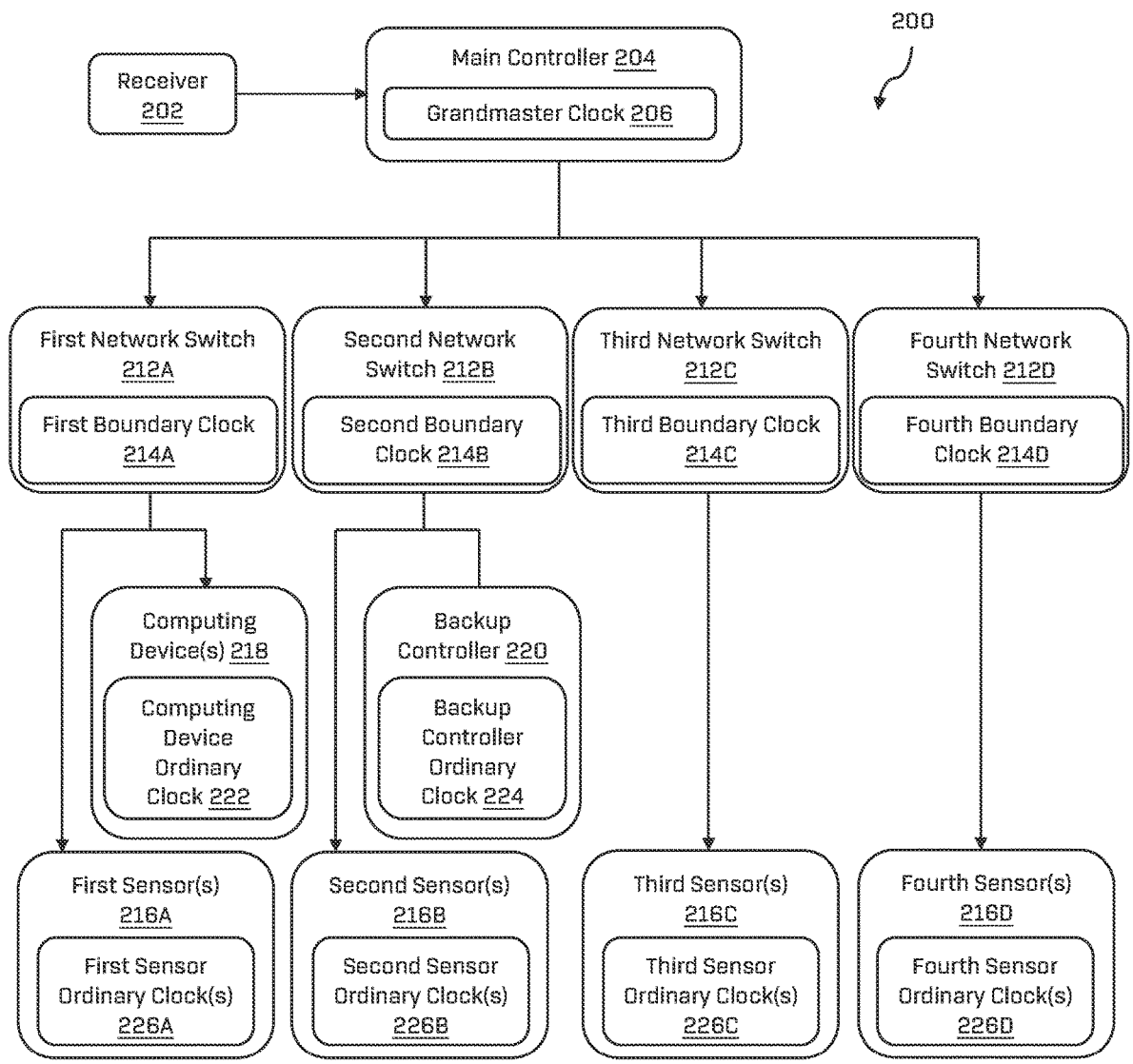
FIG. 2 is a block diagram illustrating an example vehicle system according to aspects of the present invention.

FIG. 2 illustrates an example vehicle system 200 including a timing network. The vehicle system 200 may be considered to be a more detailed representation of the system 106 of FIG. 1. FIG. 2 is depicted to show how time is synchronized through the timing network, meaning that the arrows in FIG. 2 between entities may represent the distribution of timing information and the arrangement in FIG. 2 of the components is illustrative of the hierarchy of the clocks within the system.

FIG. 2 illustrates a receiver 202, which provides timing information to a main controller 204 and grandmaster clock 206 from an external source. The receiver 202, like the receiver 108 in FIG. 1, may receive timing information from a satellite system. The main controller 204 may correspond to the control device 112 and may be an executive motion unit (EMU).

The main controller 204 may be configured, as shown in FIG. 2, to communicate with a plurality of network switches 212A-D. Each network switch may include a corresponding boundary clock 214A-D. Each network switch 212A-D may be associated with one or more corresponding sensors 216A-D. The boundary clocks 214A-D of each network switch 212A-D may therefore act as a master clock for one or more ordinary clocks 226A-C associated with the sensors 216A-D.

At least one of the network switches, in this case the first network switch 212A, may be associated with a computing device 218. For example, as with the computing device 122 of FIG. 1, the computing device 218 may be a primary computing device. Accordingly, the first boundary clock 214A associated with the first network switch 212A may act as a master clock for the computing device ordinary clock 222 that is associated with the computing device 218.

Similarly, at least one of the network switches, in this case the second network switch 212B, may be associated with a backup controller 220. Accordingly, the second boundary clock 214B associated with the second network switch 212B may act as a master clock for the backup controller ordinary clock 224 that is associated with the backup controller 220. The backup controller 220 may be configured to provide a failover for the main control unit 204. The backup controller 220 may be configured to implement control commands from the computing device 218 in the absence of the main controller 204. If it is detected that the main controller 204 has failed, is malfunctioning, or is otherwise unavailable or non-operational, the backup controller 220 may be initiated and used to perform the responsibilities associated with the main controller. However, as only a single grandmaster clock may be allowed by the clock synchronization protocol, the backup controller 220 includes only the backup controller ordinary clock 224 that synchronizes with the second-layer boundary clock 214B, rather than including a backup grandmaster clock. The backup controller 220 may receive commands from the computing device 218 and may implement those commands to operate the vehicle.

Although four network switches 212A-D and corresponding boundary clocks 214A-D are depicted here, in other examples more network switches may be provided. In other examples, fewer network switches may be provided.

Each of the network switches and associated sensors may be associated with a portion of the vehicle. For example, a vehicle including the arrangement 200 shown in FIG. 2 may be partitioned into quadrants. An example of a vehicle having a quadrant configuration is described in U.S. patent application Ser. No. 14/933,706 titled "Quadrant configuration for robotic vehicles", which is incorporated by reference in its entirety herein for all purposes. One of each of the network switches 212A-D and its associated sensors may be provided in each quadrant. A vehicle may include one or more sensor pods each having sensors configured to collect data from an environment, an example of which may be found in U.S. patent application Ser. No. 16/864,082 titled "Sensor pod assembly", which is incorporated by reference in its entirety herein for all purposes.

In the example of FIG. 2, the main controller 204 may become unavailable, meaning that the boundary clocks 214A-D are unable to align with the grandmaster clock 206. Without a master clock with which to align, in this example the grandmaster clock 206, the boundary clocks 214A-D may drift relative to one another.

Although not depicted in FIG. 2, in some examples further boundary clocks may be incorporated between the grandmaster clock and the boundary clocks 214A-D. One or more further boundary clocks may be included in separate hardware components between a main controller and one or more network switches. Alternatively or additionally, one or more further boundary clocks may be included in the main controller, which may have a plurality of switches that include the one or more further boundary clocks and the grandmaster clock. In some examples, one of the further boundary clocks may be considered to be the common master clock for later boundary clocks such as the boundary clocks 214A-D in the network switches 212A-D.

Figure 3:
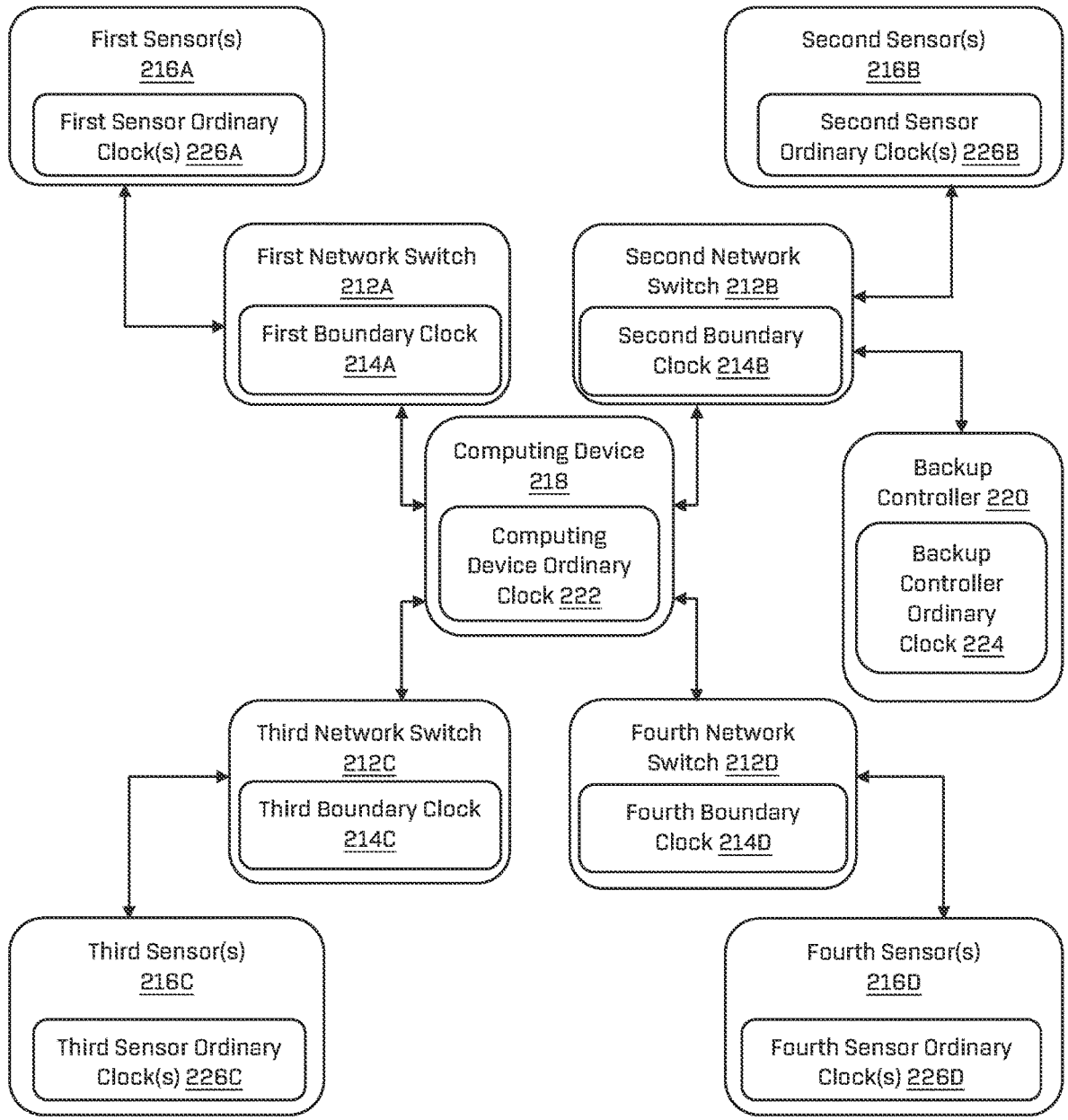
FIG. 3 is a block diagram illustrating an example architecture of a timing network of a vehicle according to aspects of the present invention.

FIG. 3 illustrates some of the components of FIG. 2 in terms of data exchange relative to the computing device 218. In other words, FIG. 3 illustrates how data may be shared from sensors 216A-D via network switches 212A-D to the computing device 218. The receiver 202 and main controller 204 are not depicted in FIG. 3.

As depicted in FIG. 3, the computing device 218 may be configured to receive and send data via each of the network switches 212A-D. Accordingly, the computing device 218 may receive data from any sensor, or other device, in the network. The computing device 218 may also be able to send commands to the backup controller 220 via the network switch 212B. Although not depicted in FIG. 3, the computing device 218 may also be able to send commands to the main controller via the network switch 212A and the main controller switch. Although not depicted in FIG. 3, each network switch 212A-D may also be connected to each other network switch 212A-D so that data may be exchanged between them. In some examples, the computing device 218 may be configured to receive data via the first network switch 212A only.

The computing device 218 is associated with computing device ordinary clock 222 that synchronizes with the first boundary clock 214A as its master clock. The computing device 218 may receive data from the first sensor(s) 216A, which may have associated first sensor ordinary clocks 226A that are configured to synchronize with the first boundary clock 214A. In the absence of a master clock with which the first boundary clock 214A can synchronize, the computing device ordinary clock 222 may be designated as the reference clock against which other timestamps from the second to fourth sensor ordinary clocks 226B-D are to be corrected. Accordingly, timing data associated with sensor data received from the second to fourth sensors 216B-D via network switches 212B-D may be corrected by the computing device 218 to correspond to the first boundary clock 214A according to which the computing device ordinary clock 222 of the computing device 218 synchronizes.

Based on the corrected timestamp, the computing device 218 may be configured to provide one or more commands to the backup controller 220 via the second network switch 212B, which may be used by the backup controller 220 to control the vehicle. The computing device 218 may be configured to further correct one or more timestamps associated with the one or more commands to be provided to the backup controller 220 to account for clock drift between the computing device ordinary clock 222 and the backup controller ordinary clock 224. In some examples, the computing device 218 may further correct one or more timestamps to account for a delay in sending information between the computing device 218 and the backup controller 220. In some examples, the computing device 218 may be configured to communicate an indication that it has performed correction of one or more timestamps along with the one or more commands. Communicating such an indication may prevent the commands and/or other data from being rejected by the backup controller 220 and/or a monitoring device that may be configured to determine compliance with the clock synchronization protocol.

The architectures depicted in FIGS. 1-3 may form part of a wider vehicle system. An example of a wider vehicle system architecture 400 is depicted in FIG. 4.

Figure 4:
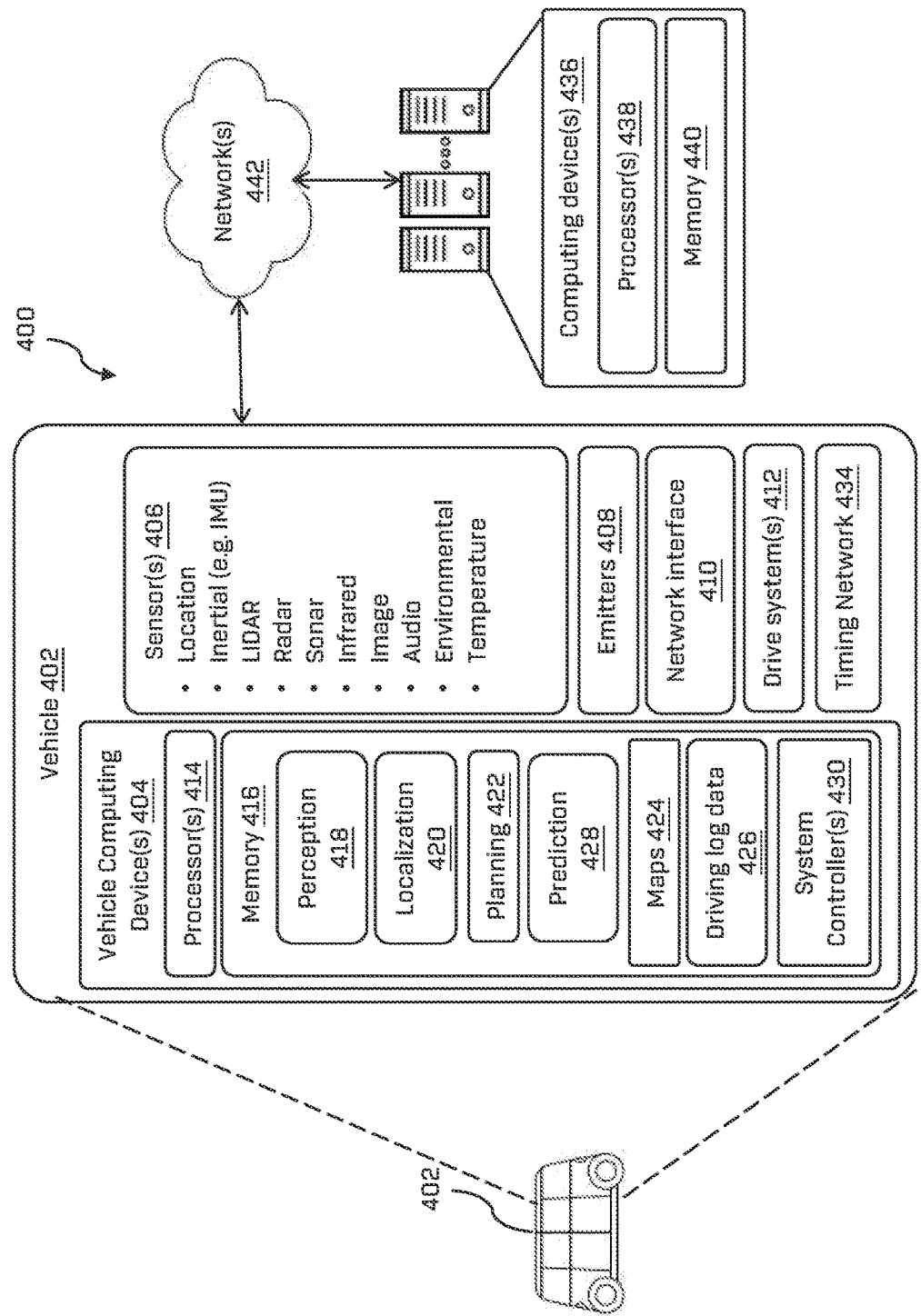
FIG. 4 is a block diagram illustrating an example architecture of a computing system of a vehicle according to aspects of the present invention.

FIG. 4 illustrates a block diagram of an example system 400 that implements the techniques discussed herein. FIG. 4 may correspond to vehicle systems 114 of FIG. 1. In some instances, the example system 400 may include a vehicle 402, which may correspond to the vehicle 102 in FIG. 1. In some instances, the vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 402 may be a fully or partially autonomous vehicle having any other level or classification.

The vehicle 402 may include a vehicle computing device(s) 404, sensor(s) 406, emitter(s) 408, network interface(s) 410, and/or drive system(s) 412, as well as a timing network 434. The system 400 may additionally or alternatively comprise computing device(s) 436. The vehicle computing device 404 may be configured to perform one or more of the methods described below. The timing network 434 is depicted in FIG. 4 separately to the other devices of the vehicle 402, although it will be appreciated that the individual clocks of the timing network 434 may be incorporated into respective devices.

In some instances, the sensor(s) 406 may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 406 may include multiple instances of each of these or other types of sensors. For instance, the radar sensors may include individual radar sensors located at the corners, front, back, sides, and/or top of the vehicle 402. As another example, the cameras may include multiple cameras disposed at various locations about the exterior and/or interior of the vehicle 402. The sensor(s) 406 may provide input to the vehicle computing device(s) 404 and/or to computing device(s) 436.

The vehicle 402 may also include emitter(s) 408 for emitting light and/or sound. The emitter(s) 408 may include interior audio and visual emitter(s) to communicate with passengers of the vehicle 402. Interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 408 may also include exterior emitter(s). Exterior emitter(s) may include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 402 may also include network interface(s) 410 that enable communication between the vehicle 402 and one or more other local or remote computing device(s). The network interface(s) 410 may facilitate communication with other local computing device(s) on the vehicle 402 and/or the drive component(s) 412. The network interface (s) 410 may additionally or alternatively allow the vehicle to communicate with other nearby computing device(s) (e.g., other nearby vehicles, traffic signals, etc.). The network interface(s) 410 may additionally or alternatively enable the vehicle 402 to communicate with computing device(s) 436 over a network 442. In some examples, computing device(s) 436 may comprise one or more nodes of a distributed computing system (e.g., a cloud computing architecture).

The vehicle 402 may include one or more drive components 412. In some instances, the vehicle 402 may have a single drive component 412. In some instances, the drive component(s) 412 may include one or more sensors to detect conditions of the drive component(s) 412 and/or the surroundings of the vehicle 402. By way of example and not limitation, the sensor(s) of the drive component(s) 412 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 412. In some cases, the sensor(s) on the drive component(s) 412 may overlap or supplement corresponding systems of the vehicle 402 (e.g., sensor(s) 406).

The drive component(s) 412 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 412 may include a drive component controller which may receive and pre-process data from the sensor(s) and to control operation of the various vehicle systems. In some instances, the drive component controller may include one or more processors and memory communicatively coupled with the one or more processors. The memory may store one or more components to perform various functionalities of the drive component(s) 412. Furthermore, the drive component(s) 412 may also include one or more communication connection(s) that enable communication by the respective drive component with one or more other local or remote computing device(s).

The vehicle computing device(s) 404 may include processor(s) 414 and memory 416 communicatively coupled with the one or more processors 414. Computing device(s) 436 may also include processor(s) 438, and/or memory 440. The processor(s) 414 and/or 438 may be any suitable processor capable of executing instructions to process data and perform operations as described herein. By way of example and not limitation, the processor(s) 414 and/or 438 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 416 and/or 440 may be examples of non-transitory computer-readable media. The memory 416 and/or 440 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), non-volatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 416 and/or memory 440 may store a perception component 418, localization component 420, planning component 422, map(s) 424, driving log data 426, prediction component 428, and/or system controller(s) 430—zero or more portions of any of which may be hardware, such as GPU(s), CPU(s), and/or other processing units. One or more of the perception component 418, localization component 420, planning component 422, and prediction component 428 may form a computing device or unit such as the device 122 of FIG. 1 or 218 of FIGS. 2 and 3. The system controllers may include the main controller 204 and backup controller 220 of FIGS. 2 and 3 or the controller 112 of FIG. 1.

The perception component 418 may detect object(s) in in an environment surrounding the vehicle 402 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 418 is referred to as perception data. The perception component 418 may be configured to associate a bounding region (or other indication) with an identified object. The perception component 418 may be configured to associate a confidence score associated with a classification of the identified object with an identified object. In some examples, objects, when rendered via a display, can be colored based on their perceived class. The object classifications determined by the perception component 418 may distinguish between different object types such as, for example, a passenger vehicle, a pedestrian, a bicyclist, motorist, a delivery truck, a semi-truck, traffic signage, and/or the like.

In at least one example, the localization component 420 may include hardware and/or software to receive data from the sensor(s) 406 to determine a position, velocity, and/or orientation of the vehicle 402 (e.g., one or more of an x-, y-, z-position, roll, pitch, or yaw). For example, the localization component 420 may include and/or request/receive map(s) 424 of an environment and can continuously determine a location, velocity, and/or orientation of the autonomous vehicle 402 within the map(s) 424. In some instances, the localization component 420 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 420 may provide data to various components of the vehicle 402 to determine an initial position of an autonomous vehicle for generating a trajectory and/or for generating map data, as discussed herein. In some examples, localization component 420 may provide, to the perception component 418, a location and/or orientation of the vehicle 402 relative to the environment and/or sensor data associated therewith.

The planning component 422 may receive a location and/or orientation of the vehicle 402 from the localization component 420 and/or perception data from the perception component 418 and may determine instructions for controlling operation of the vehicle 402 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 430 and/or drive component(s) 412 may parse/cause to be carried out, second instructions for the emitter(s) 408 may be formatted according to a second format associated therewith).

The driving log data 426 may comprise sensor data and perception data collected or determined by the vehicle 402 (e.g., by the perception component 418), as well as any other message generated and or sent by the vehicle 402 during operation including, but not limited to, control messages, error messages, etc. In some examples, the vehicle 402 may transmit the driving log data 426 to the computing device(s)

436. In some examples, the driving log data 426 may comprise (historical) perception data that was generated on the vehicle 402 during operation of the vehicle.

The prediction component 428 may generate one or more probability maps representing prediction probabilities of possible locations of one or more objects in an environment. For example, the prediction component 428 may generate one or more probability maps for vehicles, pedestrians, animals, and the like within a threshold distance from the vehicle 402. In some examples, the prediction component 428 may measure a track of an object and generate a discretized prediction probability map, a heat map, a probability distribution, a discretized probability distribution, and/or a trajectory for the object based on observed and predicted behavior. In some examples, the one or more probability maps may represent an intent of the one or more objects in the environment. In some examples, the planner component 422 may be communicatively coupled to the prediction component 428 to generate predicted trajectories of objects in an environment. For example, the prediction component 428 may generate one or more predicted trajectories for objects within a threshold distance from the vehicle 402. In some examples, the prediction component 428 may measure a trace of an object and generate a trajectory for the object based on observed and predicted behavior. Although prediction component 428 is shown on a vehicle 402 in this example, the prediction component 428 may also be provided elsewhere, such as in a remote computing device. In some examples, a prediction component may be provided at both a vehicle and a remote computing device. These components may be configured to operate according to the same or a similar algorithm.

The memory 416 and/or 440 may additionally or alternatively store a mapping system, a planning system, a ride management system, etc. Although perception component 418 and/or planning component 422 are illustrated as being stored in memory 416, perception component 418 and/or planning component 422 may include processor-executable instructions, machine-learned model(s) (e.g., a neural network), and/or hardware.

As described herein, the localization component 420, the perception component 418, the planning component 422, the prediction component 428, and/or other components of the system 400 may comprise one or more ML models. For example, the localization component 420, the perception component 418, the planning component 422, and/or the prediction component 428 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAD)), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, PointNet, and the like. In some examples, the ML model discussed herein may comprise PointPillars, SECOND, top-down feature layers (e.g., see U.S. patent application Ser. No. 15/963,833, which is incorporated in its entirety herein), and/or VoxelNet. Architecture latency optimizations may include MobilenetV2, Shufflenet, Channelnet, Peleenet, and/or the like. The ML model may comprise a residual block such as Pixor, in some examples.

Memory 416 may additionally or alternatively store one or more system controller(s) 430, which may be configured to control steering, propulsion, braking, safety, emitters, communication, and other systems of the vehicle 402. These system controller(s) 430 may communicate with and/or control corresponding systems of the drive systems(s) 412 and/or other components of the vehicle 402.

It should be noted that while FIG. 4 is illustrated as a distributed system, in alternative examples, components of the vehicle 402 may be associated with the computing device(s) 436 and/or components of the computing device(s) 436 may be associated with the vehicle 402. That is, the vehicle 402 may perform one or more of the functions associated with the computing device(s) 436, and vice versa.

Figure 5:
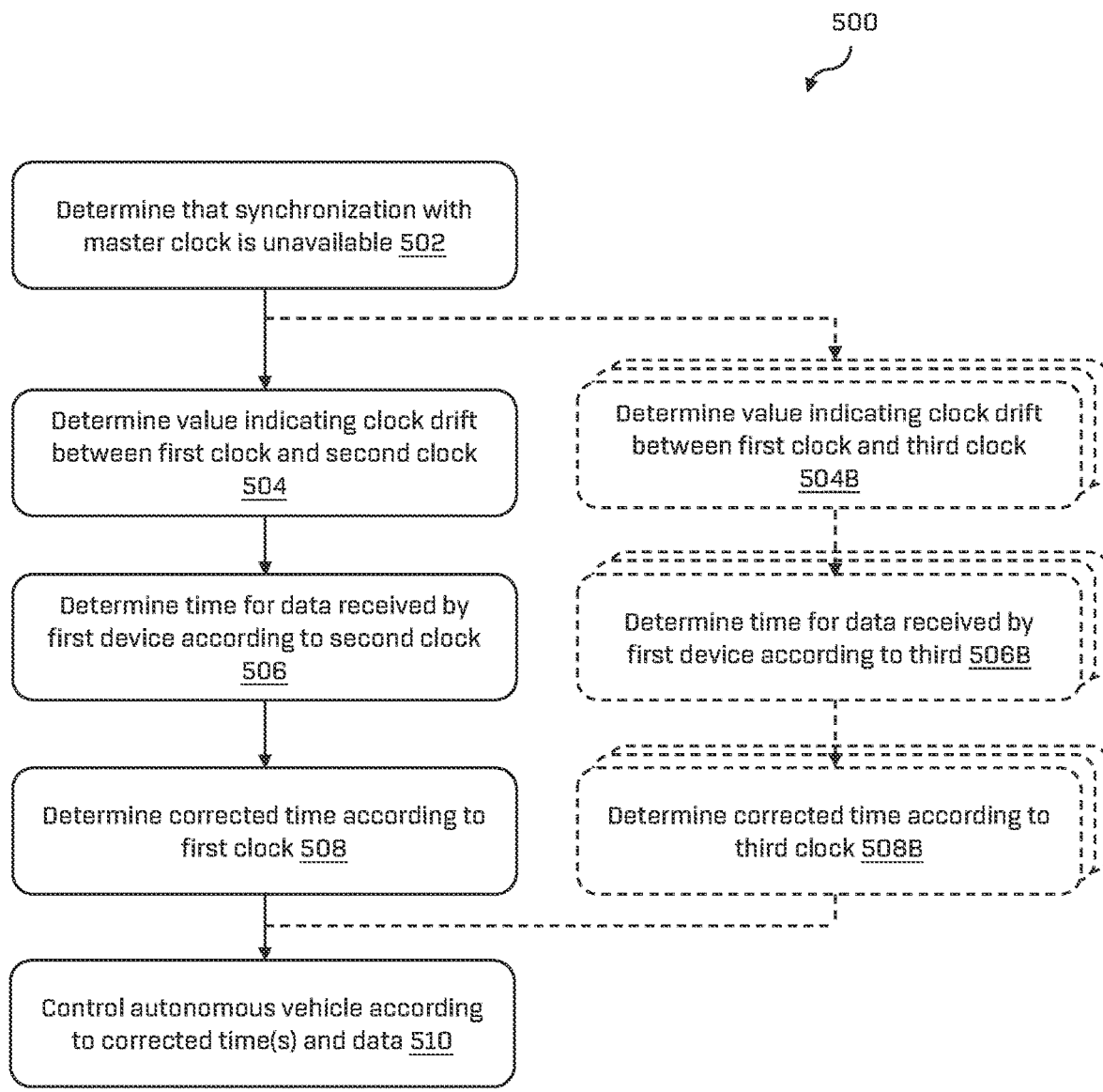
FIG. 5 is a flow chart of a process for correcting clock drift according to aspects of the present invention.
Figure 6:
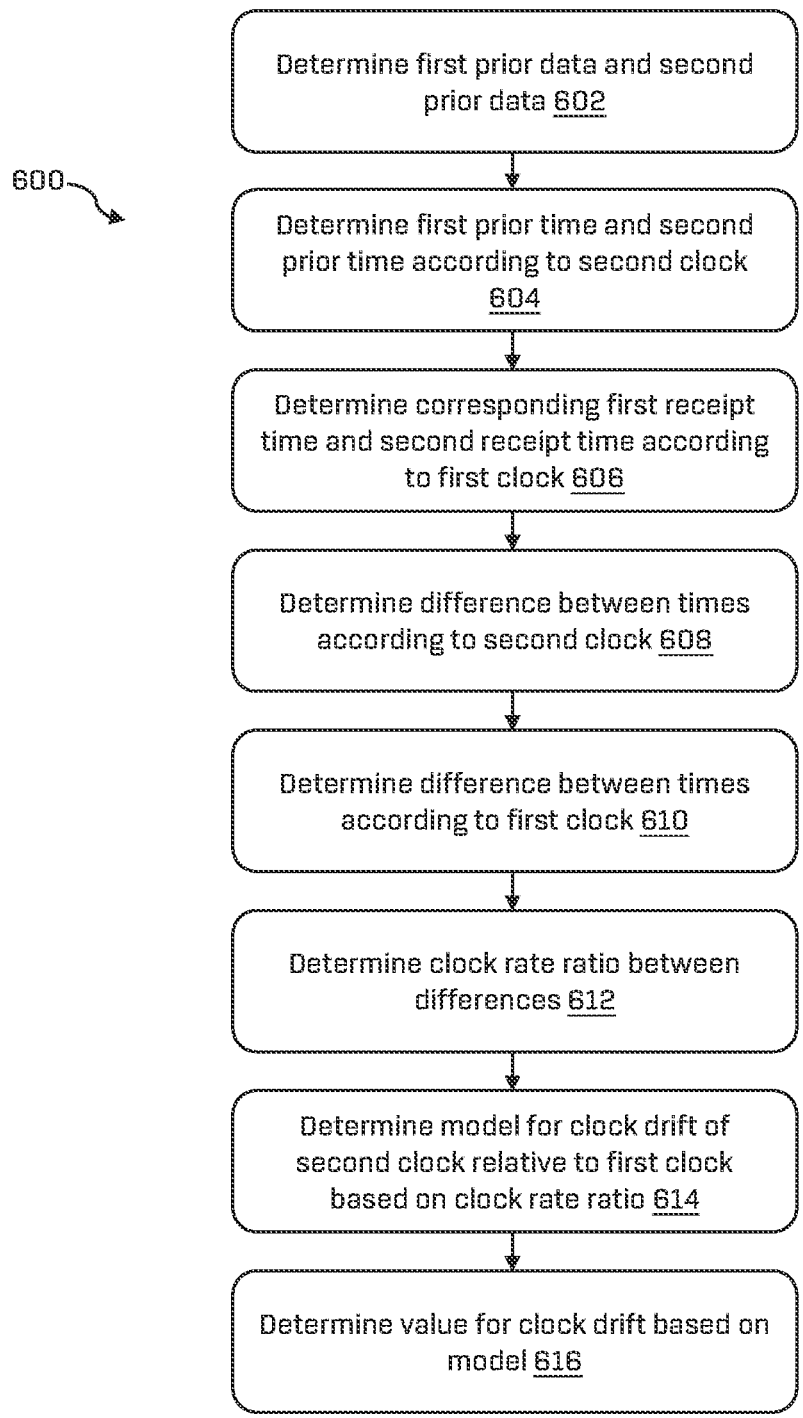
FIG. 6 is a flow chart of a process for determining a clock drift based on a clock rate ratio according to aspects of the present invention.
Figure 7:
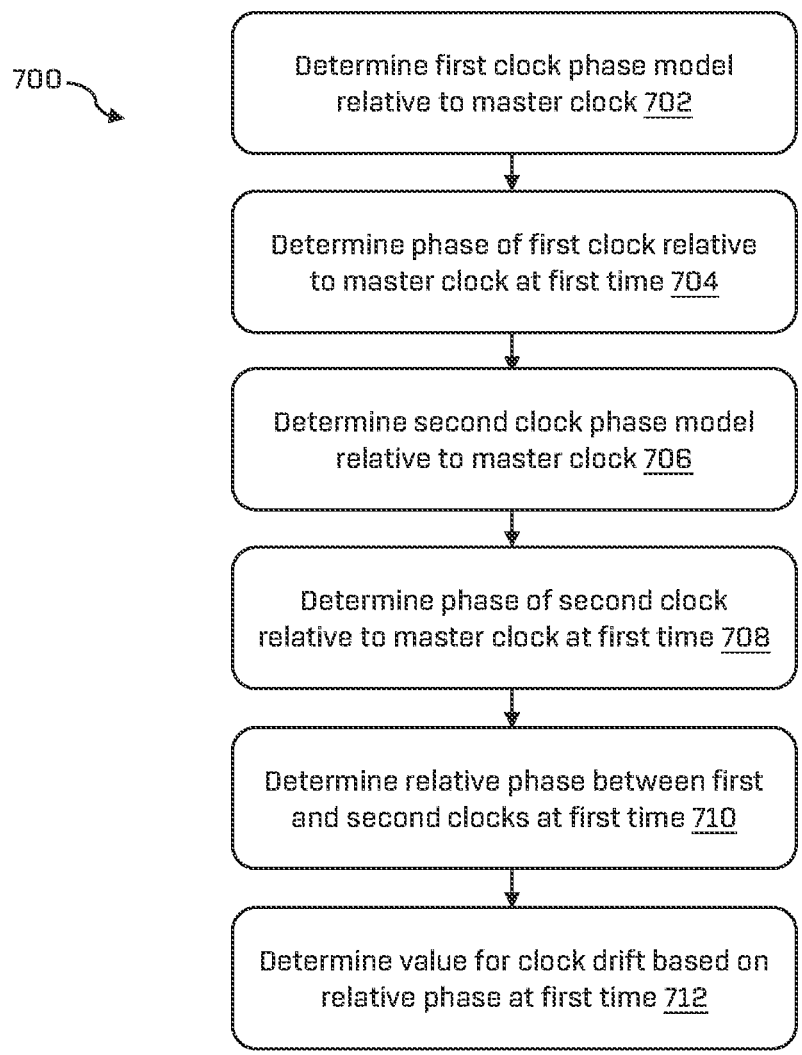
FIG. 7 is a flow chart of a process for determining a clock drift based on a relative clock phase according to aspects of the present invention.
Figure 8:
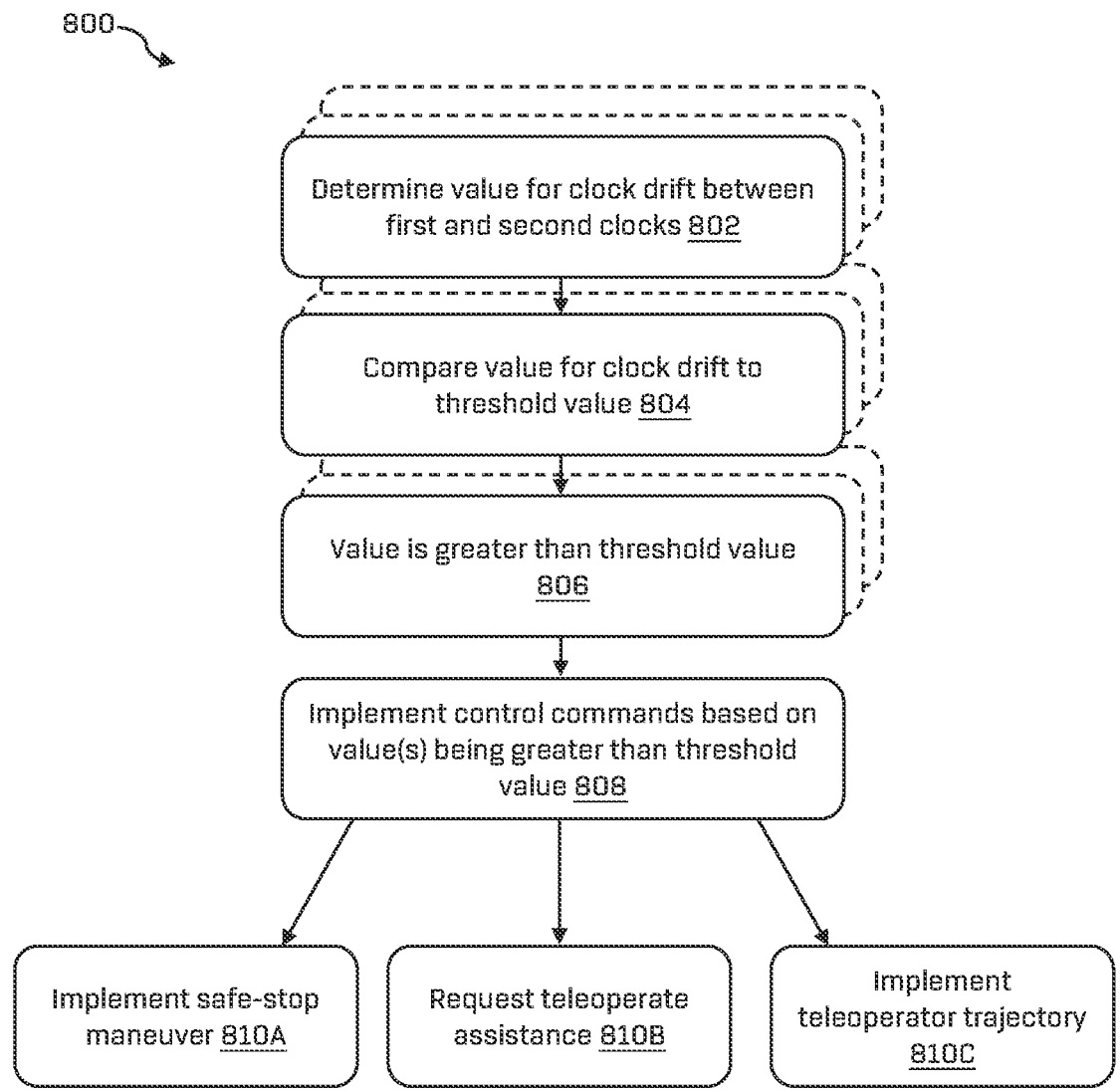
FIG. 8 is a flow chart of a process for controlling a vehicle based on clock drift according to aspects of the present invention.

FIG. 5 illustrates an example method for correction of clock drift in a timing network of a vehicle. FIGS. 6 and 7 illustrate example methods for monitoring and determining clock drift in such a timing network. FIG. 8 illustrates example methods for controlling the vehicle based on the clock drift.

In the method 500 of FIG. 5, at a first step 502, it may be determined that at least a first clock or a second clock is unable to synchronize with a common master clock. This may be referred to as synchronization being unavailable. The common master clock may be unavailable for synchronization with the first clock and the second clock. The common master clock may be unavailable for synchronization with a plurality of clocks including the first clock, the second clock, and at least one other clock. The determination may be made by a computing device, such as computing device 218 or computing device 122. The first clock may be a clock associated with a first device, such as computing device. By 'associated with', it is meant that the first clock may be a boundary clock with which an ordinary clock of the first device synchronizes or that the first clock may be an ordinary clock of the first device. The second clock may be a clock associated with a second device, such as a sensor or other device. By this, again, it is meant that the second clock may be a boundary clock with which an ordinary clock of the second device synchronizes or that the second clock may be an ordinary clock of the second device. The first and second clocks in each example may share a common master clock. The common master clock may be an immediate common master clock of the first and second clocks, e.g. a common master clock that the first and second clocks are configured to synchronize with according to the clock synchronization protocol using an exchange of messages. The common master clock may be a grandmaster clock or a boundary clock.

Without the common master clock to synchronize with, the clocks that are configured to synchronize with the master clock may drift out of synchronization with one another. At step 504, the method 500 of FIG. 5 involves determining a value indicating clock drift between the first clock and the second clock. The value may indicate an amount of clock drift between the first clock and the second clock. The amount of clock drift may be determined for a specific point in time. For example, the amount of the clock drift between the clocks may be determined based on a timestamp, e.g. a send time, a receive time, or a measurement time, associated with data received by the computing device. In some examples, the value indicating clock drift may be or be based on a weighting, factor, or ratio indicating how timestamps recorded according to one clock change relative to the other clock, and therefore indicating a relative rate. The relative rate may indirectly indicate how the clocks drift relative to one another.

The value indicating clock drift may be determined based on a metric indicating clock drift between the clocks. The metric may indicate clock drift as a function of time. The metric may comprise one or more equations and/or models of the clocks. For example, a model for the clocks describing clock drift, phase, or another metric related to clock drift may be determined. The model may describe the clock drift, phase, or other metric of the second clock relative to the first clock, and the value may be determined by evaluating the model. In another example, a first model may describe the clock drift, phase, or other metric of the first clock relative to the common master clock and a second model may describe the clock drift, phase, or other metric of the second clock relative to the common master clock. The value may be determined by evaluating both models and/or by determining a further metric based on the models. For example, a relative phase between the first and second clocks may be determined based on the models. In other examples, one or more step changes and/or frequency changes may be determined based on the models. Example methods for determining a value indicating the clock drift are described in relation to FIGS. 6 and 7 below.

In some examples, part or all of step 504 may be performed in advance of step 502. In FIG. 5, step 504 may be a reaction to the inability to synchronize with a master clock as in step 502. In other examples of the method, step 504 may be performed beforehand, such that correction of timestamps, such as in steps 506 and 508, may be performed as soon as the determination in step 502 is made.

In some examples, a computing device or a control device of the vehicle may perform monitoring of data received from sensors and their associated timestamps. The computing device or control device may determine a plurality of timestamps generated by a particular boundary clock and a plurality of corresponding timestamps generated by another clock, such as another boundary clock or the grandmaster clock. The computing or control device may be configured to generate a time series of timestamps for each clock and to identify how the clocks drift relative to one another. The computing or control device may be configured to generate a model of the clocks. A model of a clock may be determined using one or more predetermined parameters or using a machine-learned model. A model, a metric, or a value indicating clock drift of the clock may be stored in memory accessible to other devices. The memory may be memory of a device associated with a clock. For example, if a model of relative drift or phase between a clock and its master clock is determined, the model may be stored in memory associated with a sensor associated with the clock. In other examples, the model may be stored in general memory associated with the computing device. Subsequently, when it is determined that synchronization cannot be performed as in step 502, the models, metrics, or models may be retrieved from the memory in order to perform steps 506 and 508 of the method 500. In other examples, monitoring may be performed directly after the determination made in step 502.

Having determined the value indicating drift, at step 506 data may be received from the second device at the first device. The data may include a timestamp for the data. The timestamp may correspond to a send time of the data. The timestamp may correspond to a time at which the data was generated by, e.g., a sensor. The timestamp may be determined according to an ordinary clock of the second device, which is synchronized with a boundary clock. Accordingly, the time indicated by the timestamp may be said to be according to the second clock, which is associated with the second device.

The timestamp associated with the data may include an amount of drift due to drift between the first and second clocks. Therefore, in step 508 of the method 500, a corrected time is determined. The corrected time is determined by accounting for the value indicating clock drift. The corrected time can be said to be according to the first clock, because relative drift between the first and second clocks is eliminated, so that the corrected time is determined as if the two clocks were synchronized. In some examples, the corrected time may be determined by subtracting or adding an amount of drift from or to the time associated with the data. In some examples, the corrected time may be determined by applying a weighting to the time associated with the data.

Based on the corrected time and the data, the autonomous vehicle may be controlled at step 510. Control of the autonomous vehicle may include controlling the vehicle to continue along a predetermined trajectory. In some examples, as will be discussed in relation to FIG. 8, control of the vehicle may be contingent on an amount of clock drift between one or more clocks.

In FIG. 5, steps 504 to 508 are shown as being performed for clock drift between a first clock and a second clock. As indicated by the steps 504B to 508B shown in dotted lines, the steps of determining a value indicating clock drift, determining a time for data received by the first device, and determining a corrected time may additionally be performed for clock drift between the first clock and one or more further clocks. For example, in the system of FIGS. 2 and 3, steps 504 to 508 may be performed for clock drift between the boundary clock 214A and each of boundary clocks 214B, 214C, and 214D. Based on the data received by the computing device and the corrected times, the vehicle may be controlled in step 510.

Steps 504 to 508 of the method 500 may be performed by a computing device of the autonomous vehicle. Specifically, steps 504 to 508 may be performed by the computing device associated with the first clock and which receives the data in step 506.

FIG. 6 illustrates how a value indicating clock drift between a first clock and a second clock may be determined for use in, e.g. step 504. Specifically, the method 600 FIG. 6 describes how a clock rate ratio may be determined between a first clock and a second clock. The clock rate ratio may be used as the value indicating clock drift, or the value indicating clock drift may be determined based on the clock rate ratio.

In the method 600, at step 602, at least two pieces of data that are received by the first device are determined. The at least two pieces of data may be received from the second device. The at least two pieces of data may be received from another device associated with the second clock. The at least two pieces of data may be received from different devices associated with the second clock. The data may be data received before the data in step 506 of the method of FIG. 5. In some examples, the data may include the data received in step 506.

At step 604, corresponding times for the at least two pieces of data may be determined. The corresponding times may be according to the second clock. The times may be send times of the data or may be times at which the data was recorded. At step 606, corresponding times for the data according to the first clock may be determined. The corresponding times may be receipt times of the data at the first device.

From step 604 at least two times according to the second clock are determined and from step 606 at least two corresponding times according to the first clock are determined. Based on these times, an indication of relative clock drift between the first and second clocks may be determined. Based on these times, a clock rate ratio may be determined. The ratio may be based on two times from each clock or may be based on more than two times from each clock. Where two times from each clock are received, a difference may be determined between the times according to the second clock, as at step 608, and a difference may be determined between the times according to the first clock, as at step 610. At step 612, the clock rate ratio may be determined as the ratio of the difference determined in step 608 to the difference determined in step 610.

At step 614, a model may be determined based on the clock rate ratio, and at step 616, the value used in step 504 indicating the clock drift may be determined based on the model. The value may be determined by evaluating the model at a particular point in time.

The clock rate ratio may be expressed using the following equation:

$$R = \frac{T(\text{clock}_2)_2 - T(\text{clock}_2)_1}{T(\text{clock}_1)_2 - T(\text{clock}_1)_1}$$

where R is the clock rate ratio, and $T(\text{clock}_2)$ and $T(\text{clock}_1)$ are times on the second and first clocks respectively. Based on this ratio, a relationship between times on the second clock and the first clock is established.

In some examples, rather than using just two time measurements for each clock, a plurality of corresponding clock measurements may be used and a least squares estimation may be determined and used to determine a clock rate ratio. Using more time measurements in this way may be provide a more accurate estimation of clock drift.

Determining a clock rate ratio in this way may eliminate a clock offset between the two clocks, providing a ratio between the drift of the two clocks. The method 600 assumes that the clocks are linear systems, such that the phase between the two clocks includes an initial offset and a linear drift only. In other words, the method 600 assumes that the clocks drift proportionally to one another and that the rate of drift does not change over time. Such an approach may be useful where the time for which the clocks may drift relative to one another is expected to be short.

In other examples, where longer time periods are expected for the clocks to drift relative to one another, the clocks may be modelled to account for a rate of change of drift. In such cases, a clock's phase may be modelled as a second order polynomial to include an initial offset value, a drift value which is a first order term, and a drift rate value which is a second order term. FIG. 7 is an example of a method in which a second order polynomial model of a clock may be used.

As described above, in step 614, a model may be determined based on the clock rate ratio. The model may describe the clock drift of the second clock relative to the first. The model may describe the clock drift in terms of the rate ratio and an initial offset between the first and second clocks. The model may be used to determine a corrected timestamp and may be expressed as:

$$T(\text{clock}_1)_3 = RT(\text{clock}_2)_3 + b$$

where b is the initial offset of the second clock relative to the first clock.

To determine whether there was an initial offset, the measurements used to determine the clock rate ratio may be used to determine a linear regression. Alternatively, one or more other measurements may be used to determine the linear regression. The offset may be determined based on the regression.

In FIG. 7, at step 702 a phase model for the first clock may be determined relative to the common master clock. As indicated above, a phase model may be a first or second order polynomial. As an example, a first order polynomial phase model for phase of a clock relative to the common master clock may be described using the following equation:

$$\varphi_{(clock_1,master)}(t) = a_1(t) + b_1$$

where $\varphi_{(clock_1,master)}$ is the phase of the first clock relative to the master clock, $a_1(t)$ is clock drift relative to the master clock at time t and $b_1$ is an initial offset of the first clock relative to the master clock. This assumes that the time on the master clock began at zero. If the time is measured relative to a particular epoch, then (t) may be replaced by (t-TOC), where TOC is the time on the master clock at the beginning of the epoch. A second order polynomial phase model may have the following equation:

$$\varphi_{(clock_1,master)}(t) = a_1(t) + b_1 + c_1(t)^2$$

where $c_1(t)^2$ is the rate of change of clock drift over time t.

At step 704 of the method 700, the phase model of the first clock relative to the master may be evaluated at a particular time. This indicates how far a first clock may have been expected to drift over time without synchronization to the master clock.

The same process as in steps 702 and 704 may be performed for the second clock, so that a second phase model is determined and evaluated to result in a second phase value. The models for each clock may be determined based on measured drift values or estimated based on predetermined parameters.

The phases based on the phase models may be determined at a particular point in time. The point in time may correspond to the time at which the data is received from the second device, e.g. the time in step 506. The time may be an amount of time elapsed since it was determined that synchronization cannot be performed.

In some examples, terms other than the drift terms of the phase models may be ignored. For example, the '$b_1$' term in the equations above may be discounted as it may be assumed that there was no offset between the clocks at the point that synchronization was lost due to synchronization of the clocks with their common master clock up until that point.

Based on the phases, at step 710 a relative phase may be determined to indicate how much the two clocks have drifted relative to one another. In other words, a phase of the first clock may be subtracted from a phase of the second clock. A time received from the second clock may be corrected as in step 508 by adjusting to account for the relative phase between the first clock and the second clock. A relative phase may be expressed as follows:

$$\varphi_{(clock_1,clock_2)}(t_1) = \varphi_{(clock_1,master)}(t_1) - \varphi_{(clock_2,master)}(t_1)$$

The relative phase may be used, at step 712, to determine a value for clock drift. The value for clock drift may comprise the relative phase. In some examples, relative phases may be determined for two different times and subtracted to provide a first difference. A first difference between two relative phases may be determined to detect step errors in the drift. A first difference may be determined as follows:

$$\Delta_{(clock_1,clock_2)}(t_1) = \Phi_{(clock_1,clock_2)}(t_2) - \Phi_{(clock_1,clock_2)}(t_1)$$

Two first differences may be determined between at least three relative phases to provide a second difference. A second difference may be determined to detect phase drift errors or frequency jumps. A second difference may be determined as follows:

$$\Delta\Delta_{(clock_1,clock_2)}(t_1) = \Delta_{(clock_1,clock_2)}(t_2) - \Delta_{(clock_1,clock_2)}(t_1)$$

While the above methods allow for clock drift to be corrected in order to enable continued operation of the vehicle, drift between clocks that is too high may result in inaccuracies in certain interactions between the clocks. For example, some protocols according to which the clocks interact and operate may be unable to function accurately and correctly if there is a large discrepancy between timings.

FIG. 8 provides a method 800 for determining high relative drift and controlling the vehicle in such a situation. The method 800 may be performed in response to determining that synchronization with a common master clock cannot be performed. The clocks that are unable to synchronize and components associated with those clocks may be operated without synchronization with the common master clock.

In FIG. 8, a value for the clock drift between the first and second clocks may be determined at step 802. The value may be a current value. In other words, the amount of clock drift at the current time may be calculated using one or more of the techniques described above. In other examples, the techniques described above may be used to determine one or more past values or to predict one or more future values for the clock drift. The value may be determined based on a time series of previous timestamps.

The value may comprise at least one of an amount of clock drift, a relative rate, a relative phase, a first difference, or a second difference between the first and second clocks. The value may be determined using one or more models as described in relation to FIGS. 5 to 7 above.

At step 804, the value may be compared to a threshold value for the clock drift. The threshold value, which may also be referred to as a clock drift limit value or a threshold clock drift limit, may represent a maximum amount of clock drift. A threshold value may be a value above which the clock drift is unsafe for operating the vehicle, or a value above which one or more functions within the vehicle may be unable to be performed. Above the threshold value, the clock drift may cause problems with operation of the vehicle systems. The threshold value may be associated with an operational state of the vehicle.

The value may be converted to an absolute value for comparison to the threshold value. The threshold value may be a static or a dynamic threshold. A dynamic threshold may be dependent on a period since synchronization with the master clock was unavailable. In other examples, the dynamic threshold may depend on environmental factors, or on how the vehicle is operating, such as an operational mode, on whether the vehicle is travelling or stationery, or on whether the vehicle has passengers. The threshold value may differ for different clocks. For example, the threshold value may be dependent on one or more sensors associated with the second clock. One or more sensors may generate data that is more sensitive to differences in time, i.e. the one or more sensors may be more precise in their measurements, may use timestamps having a higher degree of precision, or may record data at a higher frequency. For such sensors, a different threshold value, which may be a lower threshold value for clock drift, may be applied than for other, less precise sensors.

The threshold may be determined based on one or more factors associated with operation of the vehicle. For example, a latency, such as a maximum latency or an average latency may be determined. The latency may be a latency associated with a planning or prediction component of the vehicle. An example of determining such latency may be found in U.S. patent application Ser. No. 16/225,997 titled "Safe system operation using latency determinations", which is incorporated by reference in its entirety herein for all purposes. For example, data received from a component associated with an unsynchronized clock may be considered to be stale, and could lead to an unacceptable amount of latency in the system. Other factors may include a reaction time of the vehicle and/or one or more components of the vehicle. Stale data may lead to a reaction time that is too high for safe operation of the vehicle. A reaction time may be determined based on a processing time associated with one or more components of the vehicle, such as a prediction or planning component. The threshold may be determined based on such a processing time. The threshold may be based on a synchronization period or frequency. For example, clocks may synchronize at regular intervals. If the value clock drift is greater than one or more synchronization periods then data received from different clocks may be incompatible. Examples of issues caused by unsynchronized sensor data and techniques for reducing such discrepancies are described in U.S. patent application Ser. No. 16/866,865 titled "Object velocity and/or yaw rate detection and tracking", which is incorporated by reference in its entirety herein for all purposes At step 806, it may be determined that the value exceeds the threshold value. At step 808 the vehicle may be operated based on determining that the value exceeds the threshold value. Example mitigating actions that may be performed by the vehicle based on such control are shown in steps 810A-C. The mitigating actions performed by the vehicle may allow it to continue operating safely or to operate to ensure the safety of its passengers.

The vehicle may be operated to implement or perform a predetermined maneuver, as shown in steps 810A The predetermined maneuver may be a safe-stop or contingency maneuver, in which the vehicle is controlled to follow a trajectory and/or perform one or more other actions to bring the vehicle to a safe stopping position. For example, a safe stop maneuver may comprise a trajectory to stop the vehicle by the side of a road along which it is travelling.

In some examples, as shown in step 810B, a message may be communicated to a teleoperator or other remote system. The message may comprise a request for assistance. A request for assistance may request that the teleoperator provides a trajectory for the vehicle to follow or that the teleoperator controls the vehicle. A request for assistance may request a replacement vehicle is sent to the vehicle's location to take the passengers to their destination. A request for assistance may comprise a request for maintenance. The message may comprise an indication that the first value for clock drift has exceeded the threshold value. The message may indicate that there has been a malfunction and that the common master clock is unavailable and/or that synchronization cannot be performed.

As shown in step 810C, a teleoperator may already have provided some assistance in the form of a trajectory and this trajectory may be implemented. The teleoperator may provide the trajectory in response to it being determined that the common master clock is unavailable for synchronization.

Alternatively to the mitigating actions 810A-C, or in addition to them, the vehicle may be operated in a degraded state. In the degraded state, the vehicle may be unable to perform one or more operations, may be restricted in what data can be used to operate the vehicle, or may be restricted in which components may operate or provide control commands. In the degraded state, the vehicle may be controlled according to predetermined parameters or trajectories. For example, a maximum speed of the vehicle may be changed to be lower to ensure that the vehicle is able to adequately react to environmental changes.

As illustrated by the dashed boxes behind steps 802 to 806, the determination of a value of clock drift and comparison to a threshold may be performed for a plurality of different clocks. For example, a second value for clock drift between the first clock and a third clock may be determined and compared to a threshold. The threshold may be different to the threshold for clock drift determined between the first and second clocks.

The vehicle may be controlled to implement a particular mitigating action if clock drift is above the threshold for more than one clock. For example, if the values for clock drift between the first clock and the second clock and between the first clock and the third clock are above their respective threshold values, one or more actions may be performed, whereas the action may not have been performed based on only one of the values being above the threshold.

In some examples, the vehicle may be controlled based on sensor data from sensors associated only with clocks whose drift relative to the first clock is below their respective thresholds. Data received from sensors, devices, or components associated with a clock for which it has been determined that a value for clock drift between it and the first clock is above a threshold value may be disregarded. A computing device may determine to disregard the data when it is received, and may subsequently not use that data when determining one or more control commands. In other words, where a computing device receives data from a sensor, it may determined whether the data has a timestamp determined according to a clock whose clock drift relative to the first clock is above the threshold, and if it is, then control commands or actions to be performed by the vehicle may be determined without using the data.

Where too much data is being disregarded, then the vehicle may be unable to operate safely. Accordingly, to ensure that the vehicle is able to operate safely, it may be determined whether the sensors for which data is being disregarded form a predetermined subset of sensors. For example, the number of sensors may be at or above a predetermined number. In a specific example, the computing device may be configured to receive data from 100 sensors. The vehicle may have a threshold number of operable sensors set as 80 sensors. If more than 20 sensors are therefore associated with clocks whose clock drift relative to the first clock is above the threshold, then a safe stop or other action may be performed. In some examples, the predetermined subset may be a set of safety critical sensors, that need to be operational for the vehicle to operate correctly.

In examples where the computing device is configured to disregard the sensor data, it may be determined whether sensor data from other sensors associated with other clocks is already being disregarded. For example, clock drift between the first clock and a third clock may exceed the threshold and the computing device may be disregarding data from those devices. The computing device may determine that sensors associated with the third clock and sensors associated with the second clock together form a predetermined subset of sensors. For example, the sensors associated with the second and third clocks may be system critical sensors. In other examples, the number of sensors associated with the second and third clocks may be equal to or above a predetermined number of sensors. The predetermined number of sensors may be a threshold level above which the vehicle cannot operate safely. In other words, too many sensors may be being disregarded to operate safely. The vehicle may be unable to operate safely, and so may implement a safe-stop trajectory, send a request for assistance from a teleoperator, or another safety feature.

In some examples, operation of the vehicle in the degraded state or to perform a mitigating action may be implemented only when it is determined that clock drift between the first clock and two or more other clocks is above a threshold value. Different thresholds may apply for each clock.

Where the value is a future value and it is determined that the future value exceeds the threshold, the operation in the degraded state or to perform a mitigating action may be scheduled for a time corresponding to the future value. In some examples, the time corresponding to the future value may be the time at which the future value is predicted to be reached. In other examples, the time corresponding to the future value may be a time that is a predetermined period before the future value is predicted to be reached.

In some examples, a determination may be made as to a duration between a current time and a future time at which a value for clock drift exceeds the threshold value. The duration may be a maximum time that the vehicle may operate in an autonomous mode. Trajectories and control commands may be selected and/or determined that do not exceed the future time and/or exceed the duration. A safe stop maneuver may be implemented to ensure that the vehicle is safely stopped if the duration is shorter than a predetermined duration for continued operation or if the duration meets one or more criteria for continued operation.

In some examples, it may be determined that the value for clock drift exceeds the threshold value. A rate of change of clock drift may be determined. A future time at which the value exceeds a further threshold value based on a rate of change of clock drift may be determined. The amount of time in autonomous mode may be determined based on the future time. The difference between the future time and the current time may be determined. In other words, two thresholds may be implemented. Above a first threshold, a remaining time in autonomous mode may be determined. Above the second threshold, the vehicle may be operated in the degraded state or to perform the mitigating action. The second threshold being reached may be predicted.

The vehicle may be operated in the degraded state or to perform the mitigating action based on one or more other factors. For example, a time for which the value for clock drift has exceeded the threshold value may be determined. The time may be determined based on a number of clock cycles for which the threshold value has been exceeded. If the number of clock cycles exceeds a threshold amount of clock cycles, then the vehicle may be operated in the degraded state or to perform the mitigating action.

Although not shown in FIG. 8, where, following comparison of the value to the threshold value in step 804 the value is determined not to exceed the threshold value, the vehicle may continue to use sensor data associated with the second clock for determining control commands. The vehicle may also be controlled to operate to continue to follow a current trajectory towards a predetermined location. Of course, as described above, the implementation of a control command may also be dependent on determinations made in relation to clock drift of other clocks relative to the first clock.

Example Clauses

A: a system comprising: a timing network, the timing network including: a master clock; a first boundary clock and a second boundary clock that are configured to synchronize with the master clock; a first ordinary clock associated with a primary computing device of an autonomous vehicle, wherein the first ordinary clock is configured to synchronize with the first boundary clock; and a second ordinary clock associated with a first sensor of the autonomous vehicle, wherein the second ordinary clock is configured to synchronize with the second boundary clock, and wherein the first sensor is configured to generate and provide data to the primary computing device with a timestamp determined according to the second ordinary clock; and one or more processors; and non-transitory memory storing processor-executable instructions that, when executed by the one or more processors, cause the system to perform actions including: determining that the master clock is unavailable to at least one of the first boundary clock and the second boundary clock; and, in response: determining first data and an associated first timestamp provided by the first sensor to the primary computing device, wherein the first timestamp is determined according to the second ordinary clock which is synchronized with the second boundary clock; estimating an amount of clock drift of the second boundary clock relative to the first boundary clock; adjusting the first timestamp to account for the amount of clock drift of the second boundary clock relative to the first boundary clock, such that the adjusted first timestamp is comparable with timestamps determined by the first ordinary clock that is synchronized with the first boundary clock; and controlling the autonomous vehicle based at least in part on the first data and the adjusted first timestamp.

B: a system as clause A describes, wherein the master clock is or is configured to synchronize with a grandmaster clock of the timing network, and wherein the autonomous vehicle comprises an automotive-grade component that is different to the primary computing device and the first sensor and that includes the grandmaster clock.

C: a system as clause A or clause B describes, further comprising the primary computing device, wherein the primary computing device is configured to perform at least the actions of determining the first data and the associated first timestamp, estimating the amount of drift, and adjusting the first timestamp.

D: a system as any of clauses A to C describe, wherein the instructions cause the system to perform actions including: determining a clock drift function comprising at least one of clock rate ratio or a relative phase between the first boundary clock and the second boundary clock, wherein the current amount of drift is determined based at least in part on the clock drift function.

E: a system as any of clauses A to D describe, wherein the instructions cause the system to perform actions including: determining that the amount of drift exceeds a threshold value; and, in response: determining a safe stop trajectory for the autonomous vehicle, the autonomous vehicle being controlled to implement the safe stop trajectory.

F: a method comprising: determining that at least one of a first clock or a second clock of a vehicle is unable to synchronize with a common master clock of the vehicle according to a clock synchronization protocol, wherein the first clock is associated with a first device of the vehicle and the second clock is associated with a second device of the vehicle; and in response: determining a first value indicating a relative clock drift between the first clock and the second clock; determining a first time associated with data provided by the second device to the first device, the first time being determined according to the second clock; and determining a corrected first time according to the first clock based at least in part on the first value and the first time.

G: a method as clause F describes, comprising: determining a second value indicating a relative clock drift between the first clock and a third clock that is associated with a third device and is configured to synchronize with the common master clock; determining a second time associated with data provided by the third device to the first device, the second time being determined according to the third clock; determining a corrected second time according to the first clock based at least in part on the second value and the second time; and controlling the vehicle based at least in part on the corrected second time and the corrected first time.

H: a method as clause F or clause G describe, wherein the value comprises a clock rate ratio between the first clock and the second clock.

I: a method as clause H describes, comprising: determining at least two prior times according to the second clock and associated with data provided to the first device; and determining at least two receipt times corresponding to the at least two prior times according to the first clock, wherein the clock rate ratio is determined based on the at least two prior times and the at least two receipt times.

J: a method as clause H or clause I describe, comprising: determining an initial offset between the first clock and the second clock; and determining a model indicating the clock drift of the second clock relative to the first clock, wherein the model is based on the clock rate ratio and the initial offset value and wherein the corrected first time is determined based on the model.

K: a method as any of clauses F to J describe, wherein the method comprises: determining a first model indicating a phase of the first clock relative to the common master clock; determining a second model indicating a phase of the second clock relative to the common master clock, wherein the value is determined based at least in part on a value of the first and second models at third time.

L: a method as clause K describes, wherein the value comprises at least one of a relative phase between the first and second clocks, a first difference between two relative phases, or a second difference between two first differences.

M: a method as clause K or clause L describe, wherein at least one of the first model and the second model comprises a second order polynomial equation including a clock offset term, a clock drift term, and a clock drift rate term.

N: a method as any of clauses F to M describe, comprising: determining a command for controlling the vehicle based on the corrected first time and the data; and transmitting the command and an indication that time correction has been performed to a backup controller, wherein the backup controller controls the vehicle based on the command and the indication.

O: one or more non-transitory computer-readable media storing instructions executable by one or more processors, wherein the instructions, when executed, cause the one or more processors to perform operations comprising: determining that at least one of a first clock or a second clock of a vehicle is unable to synchronize with a common master clock of the vehicle according to a clock synchronization protocol, wherein the first clock is associated with a first device of the vehicle and the second clock is associated with a second device of the vehicle; and in response: determining a first value indicating a relative clock drift between the first clock and the second clock; determining a first time associated with data provided by the second device to the first device, the first time being determined according to the second clock; and determining a corrected first time according to the first clock based at least in part on the first value and the first time.

P: a computer-readable media as clause O describes, wherein the instructions, when executed, cause the one or more processors to perform operations comprising: determining that at least one of a first clock or a second clock of a vehicle is unable to synchronize with a common master clock of the vehicle according to a clock synchronization protocol, wherein the first clock is associated with a first device of the vehicle and the second clock is associated with a second device of the vehicle; and in response: determining a first value indicating a relative clock drift between the first clock and the second clock; determining a first time associated with data provided by the second device to the first device, the first time being determined according to the second clock; and determining a corrected first time according to the first clock based at least in part on the first value and the first time.

Q: a computer-readable media as clause O or clause P describe, wherein the instructions, when executed, cause the one or more processors to perform operations comprising: determining a second value indicating a relative clock drift between the first clock and a third clock that is associated with a third device and is configured to synchronize with the common master clock; determining a second time associated with data provided by the third device to the first device, the second time being determined according to the third clock; determining a corrected second time according to the first clock based at least in part on the second value and the second time; and controlling the vehicle based at least in part on the corrected second time and the corrected first time.

R: a computer-readable media as any of clauses O to Q describe, wherein the value comprises a clock rate ratio between the first clock and the second clock.

S: a computer-readable media as any of clauses O to R describe, wherein the instructions, when executed, cause the one or more processors to perform operations comprising: determining at least two prior times according to the second clock and associated with data provided to the first device; and determining at least two receipt times corresponding to the at least two prior times according to the first clock, wherein the clock rate ratio is determined based on the at least two prior times and the at least two receipt times.

T: a computer-readable media as any of clauses O to S describe, wherein the instructions, when executed, cause the one or more processors to perform operations comprising: determining an initial offset between the first clock and the second clock; and determining a model indicating the clock drift of the second clock relative to the first clock, wherein the model is based on the clock rate ratio and the initial offset value and wherein the corrected first time is determined based on the model.

U: a computer-readable media as any of clauses O to T describe, wherein the instructions, when executed, cause the one or more processors to perform operations comprising: determining a first model indicating a phase of the first clock relative to the common master clock; determining a second model indicating a phase of the second clock relative to the common master clock, wherein the value is determined based at least in part on a value of the first and second models at third time.

V: a computer-readable media as clause U describes, wherein the instructions, when executed, cause the one or more processors to perform operations comprising: determining a first phase for the first clock relative to the common master clock based at least in part on the first model and a third time; determining a second phase for the second clock relative to the common master clock based at least in part on the second model and the third time; and determining a relative phase between the first and second clocks based on the second phase and the first phase, the value indicating clock drift being based on the relative phase.

W: a computer-readable media as clause U or clause V describe, wherein the value comprises at least one of a relative phase between the first and second clocks, a first difference between two relative phases, or a second difference between two first differences.

X: a computer-readable media as any of clauses V to W describe, wherein at least one of the first model and the second model comprises a second order polynomial equation including a clock offset term, a clock drift term, and a clock drift rate term.

Y: a computer-readable media as any of clauses O to X describe, wherein the instructions, when executed, cause the one or more processors to perform operations comprising: determining a command for controlling the vehicle based on the corrected first time and the data; and transmitting the command and an indication that time correction has been performed to a backup controller, wherein the backup controller controls the vehicle based on the command and the indication.

Z: a system comprising: one or more processors; and non-transitory memory storing processor-executable instructions that, when executed by the one or more processors, cause the system to perform actions including: determining that at least one of a first clock or a second clock of a vehicle is unable to synchronize with a common master clock of the vehicle according to a clock synchronization protocol, wherein the first clock is associated with a first device of the vehicle and the second clock is associated with a second device of the vehicle; and in response: determining a first value indicating a relative clock drift between the first clock and the second clock; determining a first time associated with data provided by the second device to the first device, the first time being determined according to the second clock; and determining a corrected first time according to the first clock based at least in part on the first value and the first time.

AA: a system comprising: a timing network, the timing network including: a master clock; a first boundary clock and a second boundary clock that are configured to synchronize with the master clock; a first ordinary clock associated with a primary computing device of an autonomous vehicle, wherein the first ordinary clock is configured to synchronize with the first boundary clock; and a second ordinary clock associated with a first sensor of the autonomous vehicle, wherein the second ordinary clock is configured to synchronize with the second boundary clock, and wherein the first sensor is configured to generate and provide data to the primary computing device with a timestamp determined according to the second ordinary clock; and one or more processors; and non-transitory memory storing processor-executable instructions that, when executed by the one or more processors, cause the primary computing device to perform actions including: determining that the master clock is unavailable for synchronization with at least one of the first boundary clock and the second boundary; operating the first boundary clock and the second boundary clock without synchronization with the master clock; estimating an amount of clock drift of the second ordinary clock relative to the first ordinary clock; comparing the amount of clock drift to a clock drift limit value that represents a threshold clock drift limit associated with an operational state of the vehicle; determining that the amount of clock drift exceeds the threshold clock drift limit; and operating the vehicle in a degraded state or performing a mitigating action based at least in part on determining that the amount of clock drift exceeds the threshold clock drift limit.

AB: a system as clause AA describes, wherein the threshold clock drift limit is based on at least in part on one or more of: a maximum latency associated with a planning or perception component of the vehicle; a maximum reaction time associated with the vehicle and/or a planning or perception component of the vehicle; and a synchronization period or frequency associated with one or more clocks of the vehicle.

AC: a system as clause AA or clause AB describe, wherein the mitigating action comprises controlling the vehicle to follow a trajectory to bring the vehicle to a safe stopping position.

AD: a system as any of clauses AA to AC describe, wherein the instructions cause the system to perform actions including: determining a number of clock cycles for which the amount of clock drift exceeds the threshold clock drift limit; determining that the number of clock cycles for which the amount of clock drift is greater than the threshold clock drift limit exceeds a threshold number of clock cycles; and wherein the operating the vehicle in a degraded state or performing a mitigating action is based on determining that the number of clock cycles is greater than the threshold number of clock cycles.

AE: a method, comprising: determining that at least one of a first component associated with a first clock or a second component associated with a second clock of a vehicle is unable to synchronize with a common master clock of the vehicle according to a clock synchronization protocol; operating the first component or the second component without synchronization of the first clock or the second clock with the master clock; determining a first value indicating a relative clock drift between the first clock and the second clock; determining that the first value exceeds a first threshold value; and operating the vehicle in a degraded state or performing a mitigating action based at least in part on determining that the first value exceeds a first threshold value.

AF: a method as clause AE describes, wherein the mitigating action comprises at least one of: implementing a safe-stop maneuver; requesting assistance from a teleoperator; or following a trajectory provided by a teleoperator.

AG: a method as clause AE or clause AF describe, comprising: determining, by the first component, to disregard data received from the second component, based at least in part on determining that the first value exceeds the first threshold value; and determining, by the first component, a control command for controlling the vehicle to perform the mitigating action based at least in part on determining to disregard data received from the second component, wherein the vehicle is operated based on the control command.

AH: a method as clause AG describes, comprising: determining a second value indicating a relative clock drift between the first clock and a third clock of the vehicle, wherein the third clock is associated with a third component; determining that the second value exceeds a second threshold value; determining, by the first component, to disregard data received from the third component, based at least in part on determining that the second value exceeds the second threshold value; and determining that the third component and the second component together form at least part of a predetermined subset of components, wherein the vehicle is operated to perform the mitigating action in dependence on said determination.

AI: a method as clause AH describes, wherein the predetermined subset of components comprises at least one of: a predetermined number of components or a predetermined set of safety critical components.

AJ: a method as any of clauses AG to AI describe, comprising: determining a second value indicating a relative clock drift between the first clock and a third clock, wherein the third clock is associated with a third component; and determining that the second value is less than or equal to a second threshold value, wherein the control command is determined based on data received by the first component from the third component, based at least in part on determining that the second value is less than or equal to a second threshold value.

AK: a method as any of clauses AE to AJ describe, wherein the first value indicating a relative clock drift comprises a relative phase value, a first difference between two relative phase values, or a second difference between two first differences.

AL: a method as any of clauses AE to AK describe, wherein the first value is based on a phase model of the second clock relative to the first clock or a first phase model of the first clock relative to the common master clock and a second phase model of the second clock relative to the common master clock.

AM: a method as any of clauses AE to AL describe, comprising determining an amount of time that the vehicle is able to operate autonomously based on determining that the first value exceeds the first threshold value, wherein the vehicle is operated in the degraded state or to perform the mitigating action based at least in part on the amount of time that the vehicle is able to operate in an autonomously.

AN: a method as clause AM describes, comprising: determining a rate of change of clock drift based at least in part on the first value; and determining, based on the rate of change of clock drift, a future time at which the relative clock drift exceeds a further threshold value, the amount of time being based on the future time.

AO: a method as any of clauses AE to AN describe, wherein the first threshold value is based on one or more of: a latency for one or more components of the vehicle; a reaction time for the vehicle and/or one or more component of the vehicle; a processing time associated with one or more components of the vehicle; and a synchronization period or frequency associated with one or more clocks.

AP: one or more non-transitory computer-readable media storing instructions executable by one or more processors, wherein the instructions, when executed, cause the one or more processors to perform operations comprising: determining that at least one of a first component associated with a first clock or a second component associated with a second clock of a vehicle is unable to synchronize with a common master clock of the vehicle according to a clock synchronization protocol; operating the first component or the second component without synchronization of the first clock or the second clock with the master clock; determining a first value indicating a relative clock drift between the first clock and the second clock; determining that the first value exceeds a first threshold value; and operating the vehicle in a degraded state or performing a mitigating action based at least in part on determining that the first value exceeds a first threshold value.

AQ: a computer-readable media as clause AP describes, wherein the mitigating action comprises at least one of: implementing a safe-stop maneuver; requesting assistance from a teleoperator; or following a trajectory provided by a teleoperator.

AR: a computer-readable media as clause AP or clause AQ describe, wherein the instructions, when executed, cause the one or more processors to perform operations comprising: determining, by the first component, to disregard data received from the second component, based at least in part on determining that the first value exceeds the first threshold value; and determining, by the first component, a control command for controlling the vehicle to perform the mitigating action based at least in part on determining to disregard data received from the second component, wherein the vehicle is operated based on the control command.

AS: a computer-readable media as clause AR describes, wherein the instructions, when executed, cause the one or more processors to perform operations comprising: determining a second value indicating a relative clock drift between the first clock and a third clock of the vehicle, wherein the third clock is associated with a third component; determining that the second value exceeds a second threshold value; determining, by the first component, to disregard data received from the third component, based at least in part on determining that the second value exceeds the second threshold value; and determining that the third component and the second component together form at least part of a predetermined subset of components, wherein the vehicle is operated to perform the mitigating action in dependence on said determination.

AT: a computer-readable media as clause AS describes, wherein the predetermined subset of components comprises at least one of: a predetermined number of components or a predetermined set of safety critical components.

AU: a computer-readable media as any of clauses AR to AT describe, wherein the instructions, when executed, cause the one or more processors to perform operations comprising: determining a second value indicating a relative clock drift between the first clock and a third clock, wherein the third clock is associated with a third component; and determining that the second value is less than or equal to a second threshold value, wherein the control command is determined based on data received by the first component from the third component, based at least in part on determining that the second value is less than or equal to a second threshold value.

AV: a computer-readable media as any of clauses AP to AU describe, wherein the first value indicating a relative clock drift comprises a relative phase value, a first difference between two relative phase values, or a second difference between two first differences.

AW: a computer-readable media as any of clauses AP to AV describe, wherein the first value is based on a phase model of the second clock relative to the first clock or a first phase model of the first clock relative to the common master clock and a second phase model of the second clock relative to the common master clock.

AX: a computer-readable media as any of clauses AP to AW describe, wherein the instructions, when executed, cause the one or more processors to perform operations comprising: determining an amount of time that the vehicle is able to operate autonomously based on determining that the first value exceeds the first threshold value, wherein the vehicle is operated in the degraded state or to perform the mitigating action based at least in part on the amount of time that the vehicle is able to operate in an autonomously.

AY: a computer-readable media as clause AX describes, wherein the instructions, when executed, cause the one or more processors to perform operations comprising: determining a rate of change of clock drift based at least in part on the first value; and determining, based on the rate of change of clock drift, a future time at which the relative clock drift exceeds a further threshold value, the amount of time being based on the future time.

AZ: a computer-readable media as any of clauses AP to AY describe, wherein the first threshold value is based on one or more of: a latency for one or more components of the vehicle; a reaction time for the vehicle and/or one or more component of the vehicle; a processing time associated with one or more components of the vehicle; and a synchronization period or frequency associated with one or more clocks.

BA: a system comprising: one or more processors; and non-transitory memory storing processor-executable instructions that, when executed by the one or more processors, cause the system to perform actions including: determining that at least one of a first component associated with a first clock or a second component associated with a second clock of a vehicle is unable to synchronize with a common master clock of the vehicle according to a clock synchronization protocol; operating the first component or the second component without synchronization of the first clock or the second clock with the master clock; determining a first value indicating a relative clock drift between the first clock and the second clock; determining that the first value exceeds a first threshold value; and operating the vehicle in a degraded state or performing a mitigating action based at least in part on determining that the first value exceeds a first threshold value.

While the example clauses described above are described with respect to one particular implementation, it should be understood that, in the context of this document, the content of the example clauses can also be implemented via a method, device, system, computer-readable medium, and/or another implementation. Additionally, any of examples A-BA may be implemented alone or in combination with any other one or more of the examples A-BA.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples may be used and that changes or alterations, such as structural changes, may be made. Such examples, changes or alterations are not necessarily departures from the scope with respect to the intended claimed subject matter. While the steps herein may be presented in a certain order, in some cases the ordering may be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into subcomputations with the same results.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow charts, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

What is claimed is:

1. A system comprising:
   a timing network, the timing network including:
   a master clock;
   a first boundary clock and a second boundary clock that are configured to synchronize with the master clock;
   a first ordinary clock associated with a primary computing device of an autonomous vehicle, wherein the first ordinary clock is configured to synchronize with the first boundary clock; and
   a second ordinary clock associated with a first sensor of the autonomous vehicle, wherein the second ordinary clock is configured to synchronize with the second boundary clock, and wherein the first sensor is configured to generate and provide data to the primary computing device with a timestamp determined according to the second ordinary clock; and
   one or more processors; and non-transitory memory storing processor-executable instructions that, when executed by the one or more processors, cause the system to perform actions including:
  determining that the master clock is unavailable to at least one of the first boundary clock and the second boundary clock; and, in response:
    determining first data and an associated first timestamp provided by the first sensor to the primary computing device, wherein the first timestamp is determined according to the second ordinary clock which is synchronized with the second boundary clock;
    estimating an amount of clock drift of the second boundary clock relative to the first boundary clock;
    adjusting the first timestamp to account for the amount of clock drift of the second boundary clock relative to the first boundary clock, such that the adjusted first timestamp is comparable with timestamps determined by the first ordinary clock that is synchronized with the first boundary clock; and
    controlling the autonomous vehicle based at least in part on the first data and the adjusted first timestamp.

2. The system of claim 1, wherein the master clock is or is configured to synchronize with a grandmaster clock of the timing network, and wherein the autonomous vehicle comprises an automotive-grade component that is different to the primary computing device and the first sensor and that includes the grandmaster clock.

3. The system of claim 1, further comprising the primary computing device, wherein the primary computing device is configured to perform at least the actions of determining the first data and the associated first timestamp, estimating the amount of drift, and adjusting the first timestamp.

4. The system of claim 1, wherein the instructions cause the system to perform actions including:
  determining a clock drift function comprising at least one of clock rate ratio or a relative phase between the first boundary clock and the second boundary clock, wherein the amount of drift is determined based at least in part on the clock drift function.

5. The system of claim 1, wherein the instructions cause the system to perform actions including:
  determining that the amount of drift exceeds a threshold value; and, in response:
    determining a safe stop trajectory for the autonomous vehicle, the autonomous vehicle being controlled to implement the safe stop trajectory.

6. A method comprising:
  determining that at least one of a first clock or a second clock of a vehicle is unable to synchronize with a common master clock of the vehicle according to a clock synchronization protocol, wherein the first clock is associated with a first device of the vehicle and the second clock is associated with a second device of the vehicle; and in response:
  determining a first value indicating a relative clock drift between the first clock and the second clock;
  determining a first time associated with data provided by the second device to the first device, the first time being determined according to the second clock; and
  determining a corrected first time according to the first clock based at least in part on the first value and the first time.

7. The method of claim 6, comprising:
  determining a second value indicating a relative clock drift between the first clock and a third clock that is associated with a third device and is configured to synchronize with the common master clock;
  determining a second time associated with data provided by the third device to the first device, the second time being determined according to the third clock;
  determining a corrected second time according to the first clock based at least in part on the second value and the second time; and
  controlling the vehicle based at least in part on the corrected second time and the corrected first time.

8. The method of claim 6, wherein the value comprises a clock rate ratio between the first clock and the second clock.

9. The method of claim 8, comprising:
  determining at least two prior times according to the second clock and associated with data provided to the first device; and
  determining at least two receipt times corresponding to the at least two prior times according to the first clock, wherein the clock rate ratio is determined based on the at least two prior times and the at least two receipt times.

10. The method of claim 8, comprising:
  determining an initial offset value between the first clock and the second clock; and
  determining a model indicating the clock drift of the second clock relative to the first clock, wherein the model is based on the clock rate ratio and the initial offset value and wherein the corrected first time is determined based on the model.

11. The method of claim 6, wherein the method comprises:
  determining a first model indicating a phase of the first clock relative to the common master clock; and
  determining a second model indicating a phase of the second clock relative to the common master clock, wherein the value is determined based at least in part on a value of the first and second models at third time.

12. The method of claim 11, wherein the value comprises at least one of a relative phase between the first and second clocks, a first difference between two relative phases, or a second difference between two first differences.

13. The method of claim 11, wherein at least one of the first model and the second model comprises a second order polynomial equation including a clock offset term, a clock drift term, and a clock drift rate term.

14. The method of claim 6, comprising:
  determining a command for controlling the vehicle based on the corrected first time and the data; and
  transmitting the command and an indication that time correction has been performed to a backup controller, wherein the backup controller controls the vehicle based on the command and the indication.

15. One or more non-transitory computer-readable media storing instructions executable by one or more processors, wherein the instructions, when executed, cause the one or more processors to perform operations comprising:
  determining that at least one of a first clock or a second clock of a vehicle is unable to synchronize with a common master clock of the vehicle according to a clock synchronization protocol, wherein the first clock is associated with a first device of the vehicle and the second clock is associated with a second device of the vehicle; and in response:
  determining a first value indicating a relative clock drift between the first clock and the second clock;
  determining a first time associated with data provided by the second device to the first device, the first time being determined according to the second clock; and determining a corrected first time according to the first clock based at least in part on the first value and the first time.

16. The computer-readable media of claim 15, wherein the value comprises a clock rate ratio between the first clock and the second clock, and wherein the instructions, when executed, cause the one or more processors to perform operations comprising:
   determining at least two prior times according to the second clock and associated with data provided to the first device; and
   determining at least two receipt times corresponding to the at least two prior times according to the first clock, wherein the clock rate ratio is determined based on the at least two prior times and the at least two receipt times.

17. The computer-readable media of claim 16, wherein the instructions, when executed, cause the one or more processors to perform operations comprising:
   determining an initial offset between the first clock and the second clock; and
   determining a model indicating the clock drift of the second clock relative to the first clock, wherein the model is based on the clock rate ratio and the initial offset value and wherein the corrected first time is determined based on the model.

18. The computer-readable media of claim 15, wherein the instructions, when executed, cause the one or more processors to perform operations comprising:
   determining a first model indicating a phase of the first clock relative to the common master clock;
   determining a second model indicating a phase of the second clock relative to the common master clock;
   determining a first phase for the first clock relative to the common master clock based at least in part on the first model and a third time;
   determining a second phase for the second clock relative to the common master clock based at least in part on the second model and the third time; and
   determining a relative phase between the first and second clocks based on the second phase and the first phase, the value indicating clock drift being based on the relative phase.

19. The computer-readable media of claim 17, wherein the value comprises at least one of a relative phase between the first and second clocks, a first difference between two relative phases, or a second difference between two first differences.

20. The computer-readable media of claim 15, comprising:
   determining a command for controlling the vehicle based on the corrected first time and the data; and
   transmitting the command and an indication that time correction has been performed to a backup controller, wherein the backup controller controls the vehicle based on the command and the indication.

* * * * *